United States Patent
Moody et al.

(10) Patent No.: US 9,329,690 B2
(45) Date of Patent: May 3, 2016

(54) MULTITOUCH CONTROL OF PETROTECHNICAL SOFTWARE

(71) Applicant: Schlumberger Technology Corporation, Sugar Land, TX (US)

(72) Inventors: Michael James Moody, Cambridgeshire (GB); Patrick Daniel Dineen, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 169 days.

(21) Appl. No.: 13/785,613

(22) Filed: Mar. 5, 2013

(65) Prior Publication Data

US 2013/0239052 A1    Sep. 12, 2013

Related U.S. Application Data

(60) Provisional application No. 61/609,034, filed on Mar. 9, 2012.

(51) Int. Cl.
| | |
|---|---|
| G06F 3/01 | (2006.01) |
| G06F 3/0488 | (2013.01) |
| G06Q 10/06 | (2012.01) |
| G06Q 10/10 | (2012.01) |
| G06Q 50/02 | (2012.01) |

(52) U.S. Cl.
CPC ............ *G06F 3/017* (2013.01); *G06F 3/04883* (2013.01); *G06Q 10/06* (2013.01); *G06Q 10/10* (2013.01); *G06Q 50/02* (2013.01)

(58) Field of Classification Search
USPC ................. 715/810; 367/68; 702/50
See application file for complete search history.

(56) References Cited

U.S. PATENT DOCUMENTS

| | | | |
|---|---|---|---|
| 6,765,570 B1* | 7/2004 | Cheung et al. ................ 345/420 |
| 7,024,021 B2* | 4/2006 | Dunn et al. ................... 382/109 |
| 7,823,080 B2* | 10/2010 | Miyajima et al. ............. 715/792 |
| 8,930,843 B2 | 1/2015 | Mangini et al. | |
| 2003/0208534 A1 | 11/2003 | Carmichael | |
| 2005/0237334 A1* | 10/2005 | Chuter ........................... 345/581 |
| 2006/0280031 A1* | 12/2006 | Chopra et al. .................. 367/68 |
| 2008/0091496 A1 | 4/2008 | Gurpinar et al. | |
| 2008/0126945 A1 | 5/2008 | Munkvold et al. | |
| 2008/0162248 A1 | 7/2008 | Vachon et al. | |
| 2008/0165185 A1* | 7/2008 | Smith et al. ................... 345/419 |
| 2008/0180405 A1* | 7/2008 | Han ..................... G06F 3/04883 345/173 |
| 2009/0192845 A1 | 7/2009 | Gudipaty et al. | |
| 2009/0307189 A1 | 12/2009 | Bobbitt et al. | |
| 2010/0325559 A1 | 12/2010 | Westerinen et al. | |
| 2011/0050562 A1* | 3/2011 | Schoen et al. ................ 345/156 |

(Continued)

OTHER PUBLICATIONS

Gestureworks, Gesture Chart, Ideum, Inc., Corrales, NM (2010).

(Continued)

*Primary Examiner* — Phenuel Salomon
(74) *Attorney, Agent, or Firm* — Alec J. McGinn

(57) ABSTRACT

A method can include commencing a petrotechnical analysis workflow that includes a plurality of tasks; initializing one or more touch modules associated with the workflow; accessing data associated with the workflow; rendering one or more visualizations of the data to a touchscreen; and sensing multiple touches via the touchscreen for controlling one or more actions associated with the workflow according to the one or more touch modules. Various other apparatuses, systems, methods, etc., are also disclosed.

18 Claims, 16 Drawing Sheets

(56) References Cited

U.S. PATENT DOCUMENTS

| | | |
|---|---|---|
| 2011/0246904 A1 | 10/2011 | Pinto et al. |
| 2012/0013547 A1 | 1/2012 | Tsirkin et al. |
| 2012/0144306 A1 | 6/2012 | Moody et al. |
| 2012/0169593 A1* | 7/2012 | Mak et al. .................... 345/157 |
| 2012/0200523 A1 | 8/2012 | Westhues |

OTHER PUBLICATIONS

Workflow, Worksteps & Processes, OCEAN® 2011.1, Schlumberger Limited, Houston, TX.

* cited by examiner

MULTITOUCH CONTROL OF PETROTECHNICAL SOFTWARE

RELATED APPLICATION

This application claims priority to and the benefit of U.S. Provisional Patent Application Ser. No. 61/609,034, entitled "Multitouch Control of Petrotechnical Software", filed 9 Mar. 2012, which is incorporated by reference herein in its entirety.

BACKGROUND

Various devices include technologies for multitouch input, gesture input, etc. As an example, consider a tablet device that includes a touchscreen that may support touch-based gestures for viewing photos where a pinch gesture may resize a photo and a swipe gesture may cause another photo to be presented. In such an example, the gestures allow a user to control two basic functions associated with a particular task, i.e., viewing photos. Various technologies, techniques, etc., described herein pertain to controlling functions associated with parallel tasks, serial tasks, multi-user tasks, etc., for example, which may be part of a workflow or workflows.

SUMMARY

A method can include commencing a petrotechnical analysis workflow that includes a plurality of tasks; initializing one or more touch modules associated with the workflow; accessing data associated with the workflow; rendering one or more visualizations of the data to a touchscreen; and sensing multiple touches via the touchscreen for controlling one or more actions associated with the workflow according to the one or more touch modules. A system can include a processor; memory operatively coupled to the processor; and one or more modules stored in the memory that include instructions executable by the processor to instruct the system to commence a petrotechnical analysis workflow that includes a plurality of tasks; initialize one or more touch modules associated with the workflow; access data associated with the workflow; render one or more visualizations of the data to a touchscreen; and sense multiple touches via the touchscreen for controlling one or more actions associated with the workflow according to the one or more touch modules. One or more computer-readable storage media can include computer-executable instructions to instruct a computing device to: commence a petrotechnical analysis workflow that includes a plurality of tasks; initialize one or more touch modules associated with the workflow; access data associated with the workflow; render one or more visualizations of the data to a touchscreen; and sense multiple touches via the touchscreen for controlling one or more actions associated with the workflow according to the one or more touch modules. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
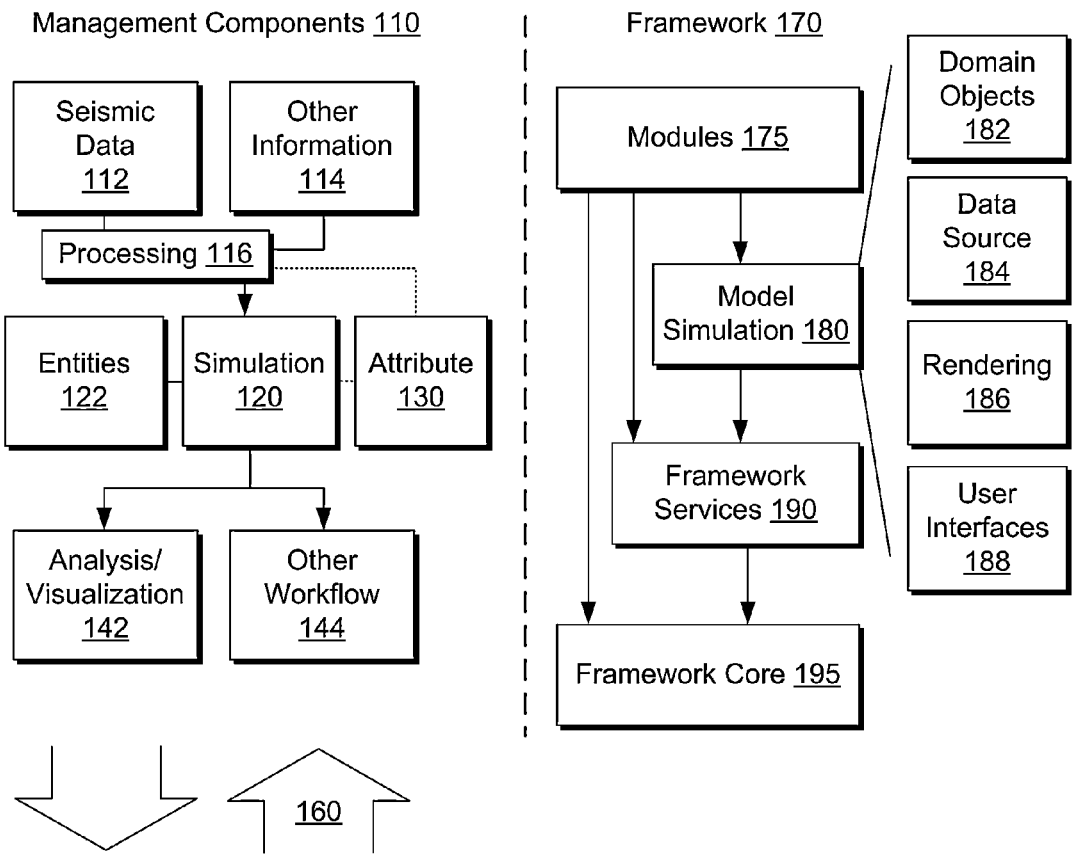
FIG. 1 illustrates an example system that includes various components for simulating a geological environment.
Figure 1:
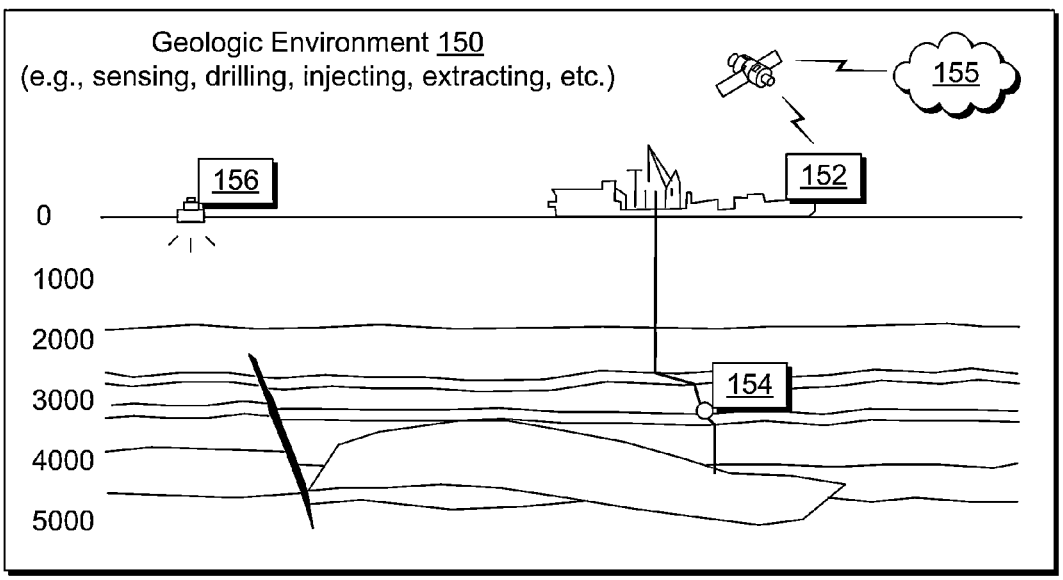

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

In geophysics, a process that may be referred to interpretation can include analyzing data, for example, to generate reasonable models and predictions about the properties and structures of a geologic environment (e.g., subsurface properties and structures). As an example, one type of data to be interpreted may be seismic data. For example, a three-dimensional volume of seismic data may be organized by numerous closely-spaced seismic lines (e.g., inlines and crosslines) where spacing aims to provide a high spatially sampled measure of subsurface reflectivity. Such a data volume may be "cut", transformed, processed, etc. Interpretation of a seismic volume may include cutting, transforming, processing, etc., as part of an effort to identify geological events, geobodies, etc. and to locate such features in their proper vertical and horizontal positions. As an example, a user may cut a seismic volume to present a two-dimensional surface and then identify a feature on that two-dimensional surface and then re-cut the seismic volume in an effort to identify the same feature in another plane (e.g., on another two-dimensional surface), etc.

As an example, interpretation of seismic data may be provided as part of a petrotechnical service, for example, that may use petrotechnical software to access data, analyze data, etc. Petrotechnical services may be provided using a team approach, for example, where various tasks are divided amongst members of the team. In such an example, an overall workflow may exist, which may change depending on individual tasks performed by team members. Thus, collaboration may benefit team members, for example, to help ensure that appropriate adaptations may take place to the workflow in response to results stemming from the performance of one or more tasks.

As an example, consider dividing a seismic volume into eight sectors distributed to eight individuals for interpretation. In such an example, a feature may emerge from one sector and continue to another sector. With collaboration, an individual may temporarily grab the other sector (e.g., a visual representation of seismic data for the other sector) and mark it to expedite interpretation of that other sector by another individual. More specifically, a touchscreen may provide for rendering multiple views of multiple sectors, for example, where an individual may perform tasks on one sector while viewing tasks being performed on one or more neighboring sectors. Where multitouch commands are available, an individual may, for example, grab a neighboring sector to assist another individual and, in turn, expedite the overall workflow.

While the foregoing example mentions individuals performing tasks that may have commonalities, petrotechnical services may employ individuals across a broad range of disciplines, for example, for purposes of reservoir characterization, interpretation, reservoir and production solutions, geomechanics studies, rapid evaluations, field-development planning, etc.

As an example, petrotechnical services may include geomechanics petrotechnical services (e.g., predicting drilling risks, maximizing recovery from mature assets, etc.), unconventional resources petrotechnical services (e.g., improving recovery of unconventional resources, providing solutions across a project life cycle, etc.), shale oil petrotechnical services, accelerated unconventional play assessment petrotechnical services, petrophysics interpretation services (e.g., processing, interpretation, integration of E&P data, etc.), geology interpretation services (e.g., borehole imaging services for microresistivity formation images, etc.), geophysics interpretation services (e.g., integrating seismic attribute interpretation and analysis with the results of stratigraphic, structural, and geochemical analysis to identify prospects, etc.), etc.

FIG. 1 shows an example of a system 100 that includes various management components 110 to manage various aspects of a geologic environment 150 (e.g., an environment that includes a sedimentary basin). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114).

In an example embodiment, the simulation component 120 may rely on a software framework such as an object-based framework. In such a framework, entities may include entities based on pre-defined classes to facilitate modeling and simulation. A commercially available example of an object-based framework is the MICROSOFT® .NET™ framework (Redmond, Wash.), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120. Alternatively, or in addition, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results. Additionally, or alternatively, output from the simulation component 120 may be input to one or more other workflows, as indicated by a workflow component 144.

In an example embodiment, the management components 110 may include features of a commercially available simulation framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment).

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a reservoir or reservoirs may be simulated with respect to one or more enhanced recovery techniques (e.g., consider a thermal process such as SAGD, etc.). As an example, a simulator may accept as input a grid such as, for example, a structured grid for purposes of simulating one or more physical phenomena. As an example, such a structured grid may be generated by transforming a grid in a computational space to a grid in a real space, for example, where one or more faults have been introduced into the grid in the computational space such that the one or more faults exist in the structured grid in the real space (e.g., structured according to an indexing system).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

The model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

In the example of FIG. 1, the domain objects 182 can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a workflow task (e.g., a workstep), a modeling session, etc., a user may store a project. At a later time, the project can be accessed and restored using the model simulation layer 180, which can recreate instances of the relevant domain objects.

In the example of FIG. 1, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc.

As mentioned the system 100 of FIG. 1 may be used to perform one or more tasks, workflows, etc. For example, the system 100 may include a workflow editor module to create, edit, etc. one or more workflows. As an example, the system 100 may include a task (e.g., or workstep) creator that can create, edit, etc. one or more tasks (e.g., or worksteps). As an example, the system 100 may include options to associate a task with one or more multitouch commands, which may include gesture commands. For example, where a user implements an interpretation tool (e.g., as part of a framework) to perform a task using a touchscreen, the one or more multitouch commands may become available; whereas, if the user is not using a touchscreen, the commands may be available via other means such as a keyboard, a mouse, a trackball, etc. As an example, a workflow may be created that provides multitouch command options that can be implemented for use on appropriate multitouch hardware. Such a workflow may be created for performance by an individual or a team, for example, with appropriate provisions to optionally allow for mixed hardware types (e.g., one individual with a touchscreen and another individual with a trackball).

As to types of hardware that may be considered suitable for multitouch input, for example, consider capacitive, resistive, acoustic, optical, embedded and other technologies. As an example, a capacitive multitouch device may include circuitry for projected capacitance, surface capacitance, etc. Touch technology may include circuitry for sensing voltage, current, ultrasonic waves, capacitance change, light, images, force, etc. Multitouch may be defined, for example, as an ability to recognize two or more simultaneous touch points. As described herein, multitouch may include time dependent touch or touches, which may optionally be performed using a single digit (e.g., index finger tapping, etc.).

Figure 2:
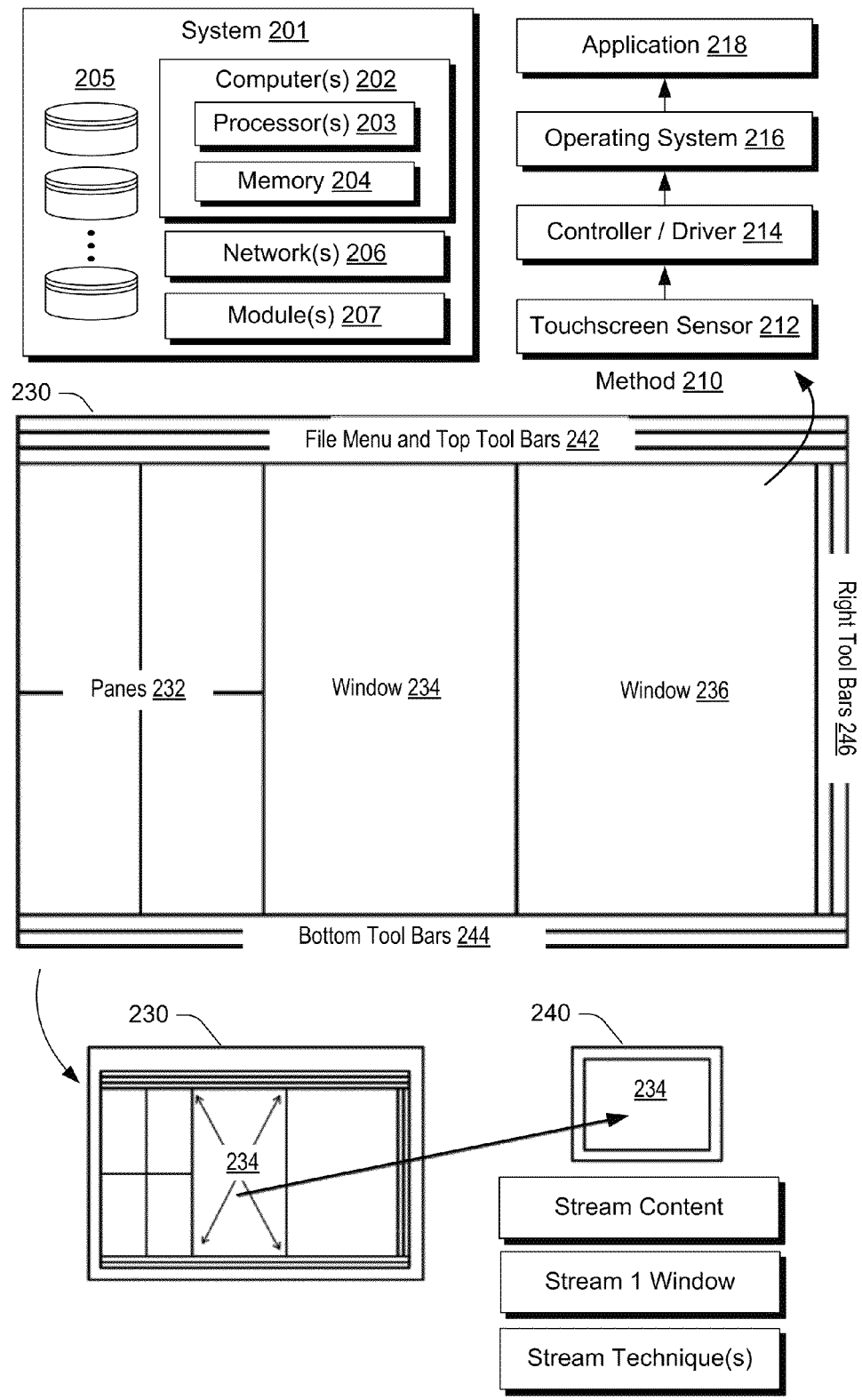
FIG. 2 illustrates an example of a system, an example of a method an example of a touchscreen and an example of information streaming.

FIG. 2 shows an example of a system 201, a method 210, a screen 230 and another screen 234. As shown, the system 201 includes one or more computers 202, one or more storage devices 205, one or more networks 206 and one or more modules 207. As to the one or more computers 202, each computer may include one or more processors (e.g., or processing cores) 203 and memory 204 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 205 where the computer(s) 202 may access the data via the network(s) 206 and process the data via the module(s) 207, for example, as stored in the memory 204 and executed by the processor(s) 203.

As to the method 210, it includes a touchscreen sensor block 212, that provides information to a controller/driver block 214 that can instruct an operating system block 216 to interact with an application block 218 (e.g., which may be implemented using software, a framework, a plug-in, an API, etc.). As an example, the touchscreen sensor block 212 may be configured to sense multiple simultaneous points (e.g., touches), the controller/driver block 214 may be configured to deliver sets of simultaneous points to the operation system block 216 to allow the operating system block 216 to forward multiple streams of moving points (e.g., and optionally acting on a defined subset thereof) to the application block 218, which may be configured to decode the multiple streams of moving points and taking one or more actions in response.

As an example, an interface device (e.g., for sensing touch) may implement one or more operating systems. As an example, consider the family of iOS® operating systems (marketed by Apple Inc., Cupertino, Calif. under license of a trademark of Cisco Systems, Inc., San Jose, Calif.). As to some other examples, one or more of the following operating systems may be implemented WINDOWS® OS family (Microsoft Corp., Redmond, Wash.), ANDROID™ OS family (a trademark of Google Inc., Mountain View, Calif.), the PALM® (or Garnet) OS family (Hewlett-Packard Co., Palo Alto, Calif.), etc.

Software operating on a computing device may include a seismic-to-simulation software suite, such as the PETREL® software (which may be referred to herein as a framework); noting that the PETREL® framework is an example as other petrotechnical softwares may include code, plug-ins, APIs, etc. for one or more techniques, technologies, etc. described herein (e.g., consider the ECLIPSE®, the GEOFRAME®, the INTERSECT®, the PIPESIM®, the TECHLOG® and the MALCOM® families of technologies).

In the example of FIG. 2, the screen 230 includes peripheral features that may be referred to as "chrome" (e.g., file menu and top tool bars 242, bottom tool bars 244, and right tool bars 246) and more central features (e.g., panes 232 and windows 234 and 236). As an example, a system may act to stream content being rendered to the screen 230 to the screen 240. As an example, such an approach may enhance collaboration where the screen 230 is being used at one location and the screen 240 is being used at another location. As an example, a user at the screen 230 may initiate streaming to one or more other screens such as the screen 240 or a user at the screen 240 may initiate streaming from the screen 230, or optionally vice versa. As to streaming techniques, a technique may be hardware dependent, bandwidth dependent, etc. For example, where the screen 240 is a screen of a smart phone, a data compression technique may compress data prior to transmitting the data via a cellular phone network to the smart phone. As an example, image data may be streamed rather than underlying data. As an example, where a screen renders vector processed data, streaming may stream the data and vector instructions for remote processing or optionally, for example, stream an image of rendered vector processed data (e.g., consider a print screen command that captures a screen image that may then be communicated for rendering at another device). As an example, streaming may include pixel or voxel streaming.

As an example, streaming may include streaming content without chrome. For example, content of the window 234 of the screen 230 may be streamed to the screen 240 without the one or more pieces of chrome (see, e.g., items 242, 244 and 246). As an example, streaming may include streaming a portion of a screen. For example, either of the window 234 or the window 236 may be streamed and rendered on the screen 240.

As an example, a system may include a remote device (e.g., a tablet device) with a touchscreen for input of touches that are streamed to controllers on another device (e.g., a desktop computer) for manipulating views, taking actions, etc., which, in turn, after performed may cause one or more visualizations stemming from the input to be replicated on the remote device (e.g., consider camera manipulation touches being input on a remote device where graphics computing is performed on another device and a final result streamed to the remote device).

Figure 3:
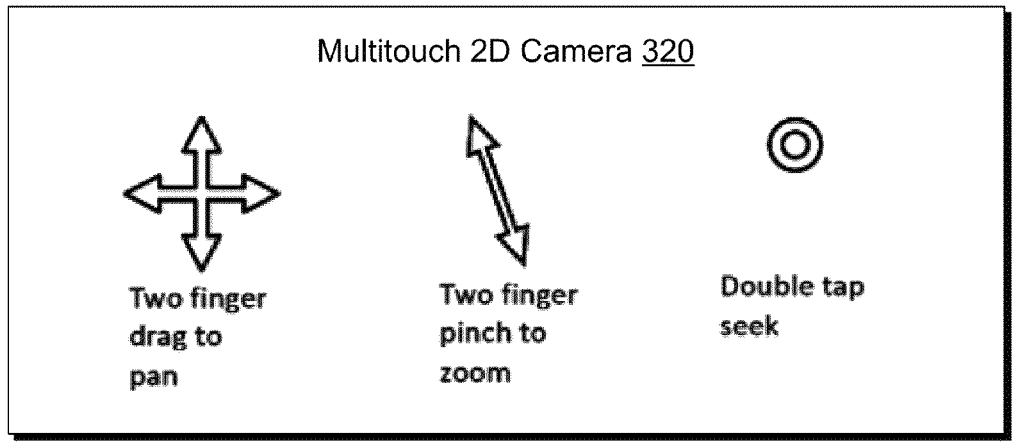
FIG. 3 illustrates examples of touches for a multitouch 2D camera, examples of touches for a mutlitouch 3D camera and an example of a method.
Figure 3:
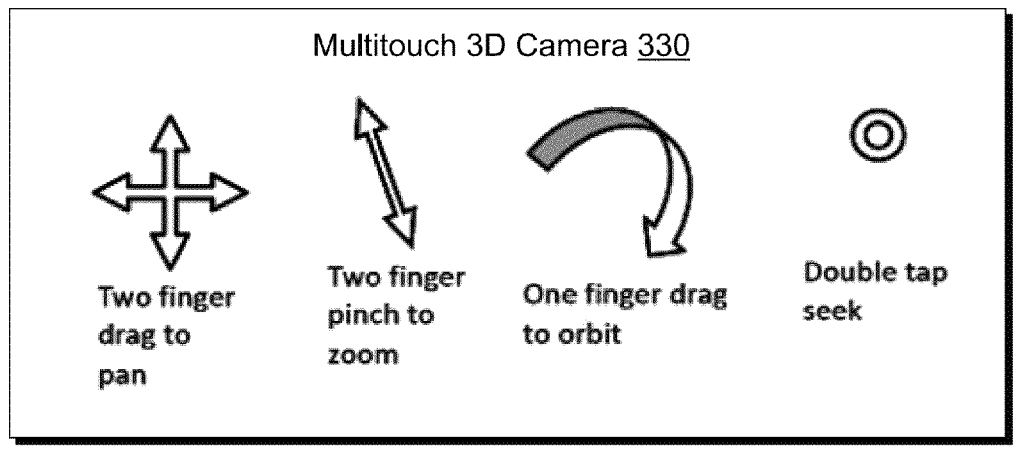
Figure 3:
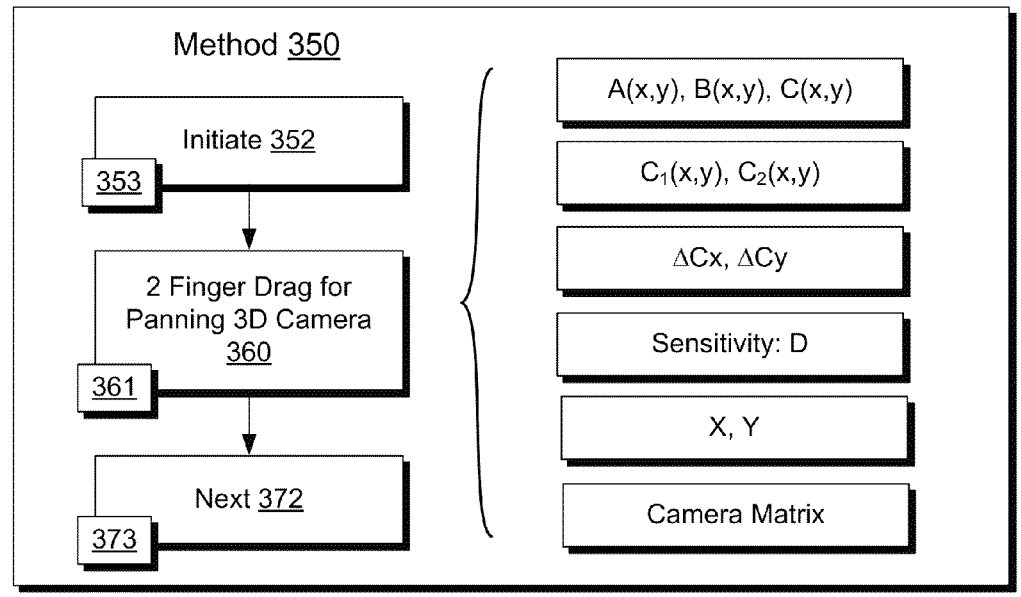

FIG. 3 shows examples of multitouch inputs 320 and 330 and an example of a method 350 where the multitouch inputs 320 correspond to a two-dimensional camera and the multitouch inputs 330 correspond to a three-dimensional camera. For example, a 2D camera may be available in a 2D view of seismic data (e.g., a planar image) while a 3D camera may be available in a 3D view of seismic data (e.g., a perspective view).

As an example, a view may include one or more camera, for example, to provide for different perspectives. As an example, a touch may be input to control position and focal distance of a camera. As an example, a seek gesture (e.g., a double tap) may changes two degrees of freedom, a pan in the view plane, etc. As an example, where an object may be positioned off-center in a screen, a seek gesture may cause the object to be rendered to center, optionally with zoom (e.g., at pre-defined length).

As to the method 350, it includes an initiation block 352, a command block 360 and a next block 372. In the example of FIG. 3, the command block 360 provides a command responsive to a two finger drag for panning a 3D camera. As an example, the method 350 may be initiated via the initiation block 352 and a two finger drag sensed inside a 3D window to result in a command per the command block 350 that causes panning of a 3D camera. In such an example, $A(x,y)$ and $B(x,y)$ may represent contact points for each of the two fingers and $C(x,y)$ may be the bisector of the vector AB. In such an example, $C_1(x,y)$ and $C_2(x,y)$ represent where the initial contact was made and broken respectively, with $\Delta Cx$ and $\Delta Cy$ being the scalar distances in screen space of the gesture. In such an example, the delta values may be normalized to window dimensions in screen space and multiplied by a configurable constant D that determines the sensitivity of the gesture. The X and Y values may then be used to generate a transition matrix, which may then be multiplied by an existing camera matrix to update the view.

The method 350 is shown in FIG. 3 in association with various computer-readable media (CRM) blocks 353, 361, and 373. Such blocks generally include instructions suitable for execution by one or more processors (or cores) to instruct a computing device or system to perform one or more actions. While various blocks are shown, a single medium may be configured with instructions to allow for, at least in part, performance of various actions of the method 350. As an example, a computer-readable medium (CRM) may be a computer-readable storage medium. As an example, a CRM block may be a module, for example, such as a module as in the one or more modules 207 of the system 201. In such an example, the system 201 may be implemented to perform, at least in part, the method 350 of FIG. 3.

Figure 4:
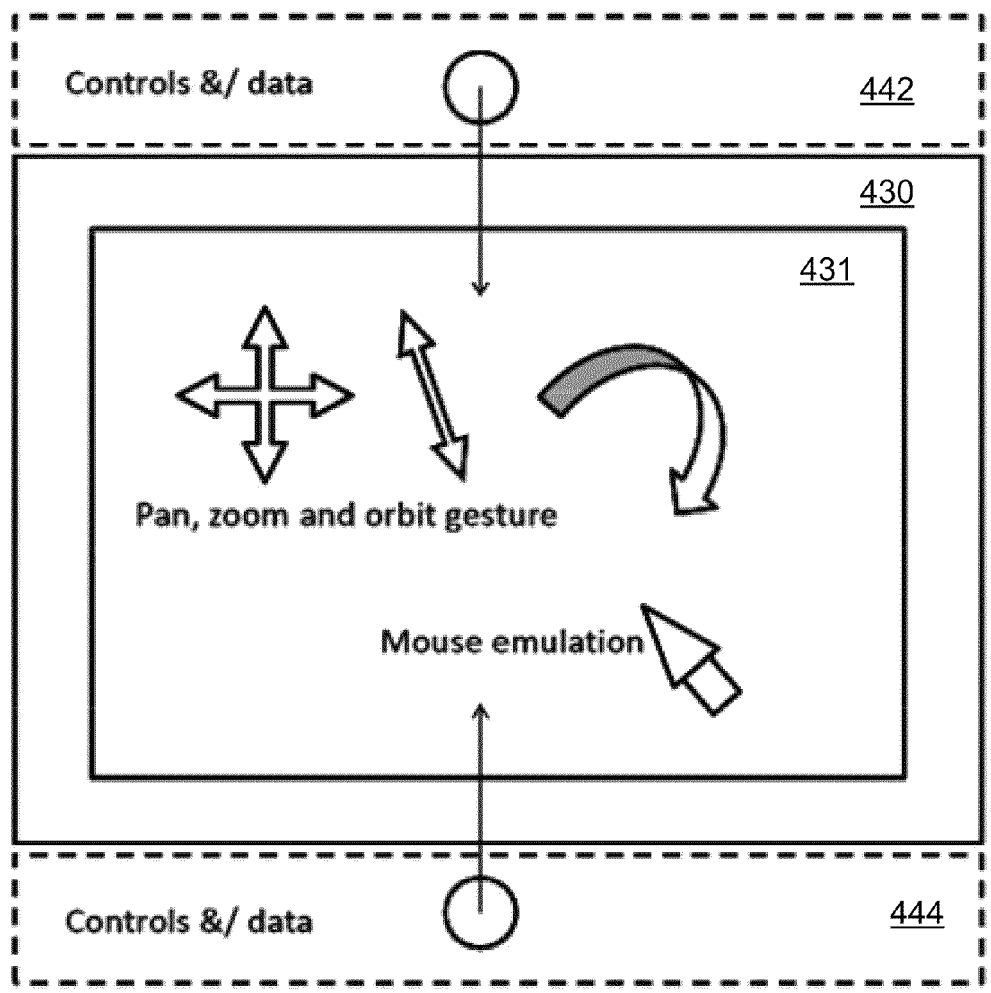
FIG. 4 illustrates an example of a touchscreen with slide in/slide out features and an example of a workflow.
Figure 4:
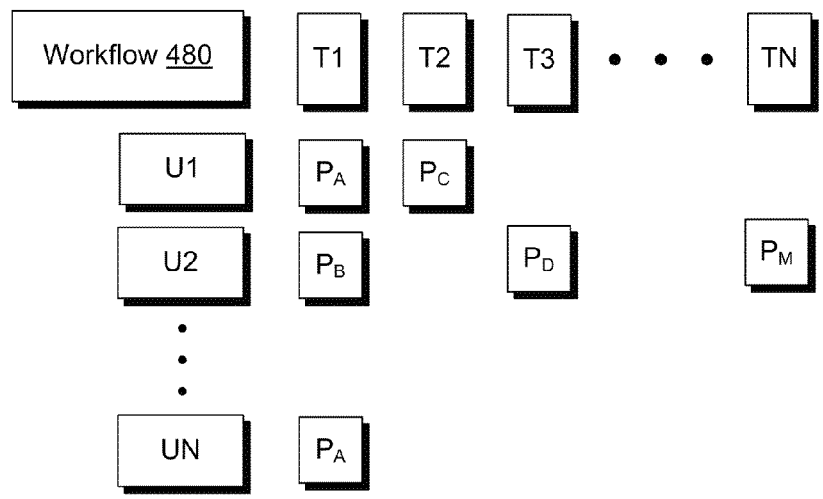

FIG. 4 shows an example of a screen 430 that includes a touch region 431 for sensing touches using touch circuitry and selectable chrome regions 442 and 444 that may be selected and rendered in portions of the touch region 431. As shown in the example of FIG. 4, the touch region 431 may provide for inputting touches for pan, zoom, orbit gestures, mouse emulation, etc. and the chrome regions 442 and 444 may provide for rendering of touch activatable controls, data, etc.

FIG. 4 also shows an example of a workflow 480 that includes tasks T1 to TN, users U1 to UN and a set of parameters $P_A$, $P_B$, $P_C$, $P_D$, to $P_M$ that set one or more controls (e.g., tools menu items, tools, help menu items, etc.). As an example, T1 of the workflow 480 may be performed by users U1 to UN where sets of parameters may be the same or differ for each of the users. As an example, where users are to collaborate, the collaborating users may use the same set of parameters for controlling actions via one or more touchscreens. As an example, the second task (T2) of the workflow 480 may involve the first user (U1) and a set of parameters $P_C$ that may be specific to the second task (T2).

As an example a workflow component may include associated sets of parameters that may optionally be selected, for example, using a workflow editor, a workstep creator (e.g., task creator), etc. As an example, such a workflow component may include discovery code to discovery a type of hardware, for example, to determine whether a touchscreen is available for use in performing the workflow and optionally the types of touches, gestures, etc. that may be input using that touchscreen (see, e.g., the blocks 212 and 214 of the method 210 of FIG. 2).

Referring again to the system 100 of FIG. 1, as mentioned the framework 170 may include the domain objects 182, which may include can include entity objects, property objects and optionally other objects where entity objects may be used to geometrically represent wells, surfaces, reservoirs, etc., while property objects may be used to provide property values as well as data versions and display parameters. As an example, a property object may include one or more parameters associated with a touchscreen setting (e.g., touchscreen touch capabilities, etc.). As an example, a touch module may be configured as a plug-in, for example, that can plug into a framework (e.g., consider the aforementioned OCEAN® framework).

As an example, a system may provide for multitouch gestures to control cameras in a 2D or a 3D window, slide in touch-friendly menus, touch (e.g., or active stylus) to perform domain specific workflow interpretation, multitouch gestures to directly manipulate domain objects, multitouch gestures to trigger one or more tasks (e.g., optionally global tasks). As an example, where a screen displays multiple panels, touches such as a three finger downward swipe may cause the panels to tile vertically while a three finger upward swipe may cause the panels to tile horizontally. In such an example, a three finger tap may cause the panels to be displayed (e.g., "view all").

Figure 5:
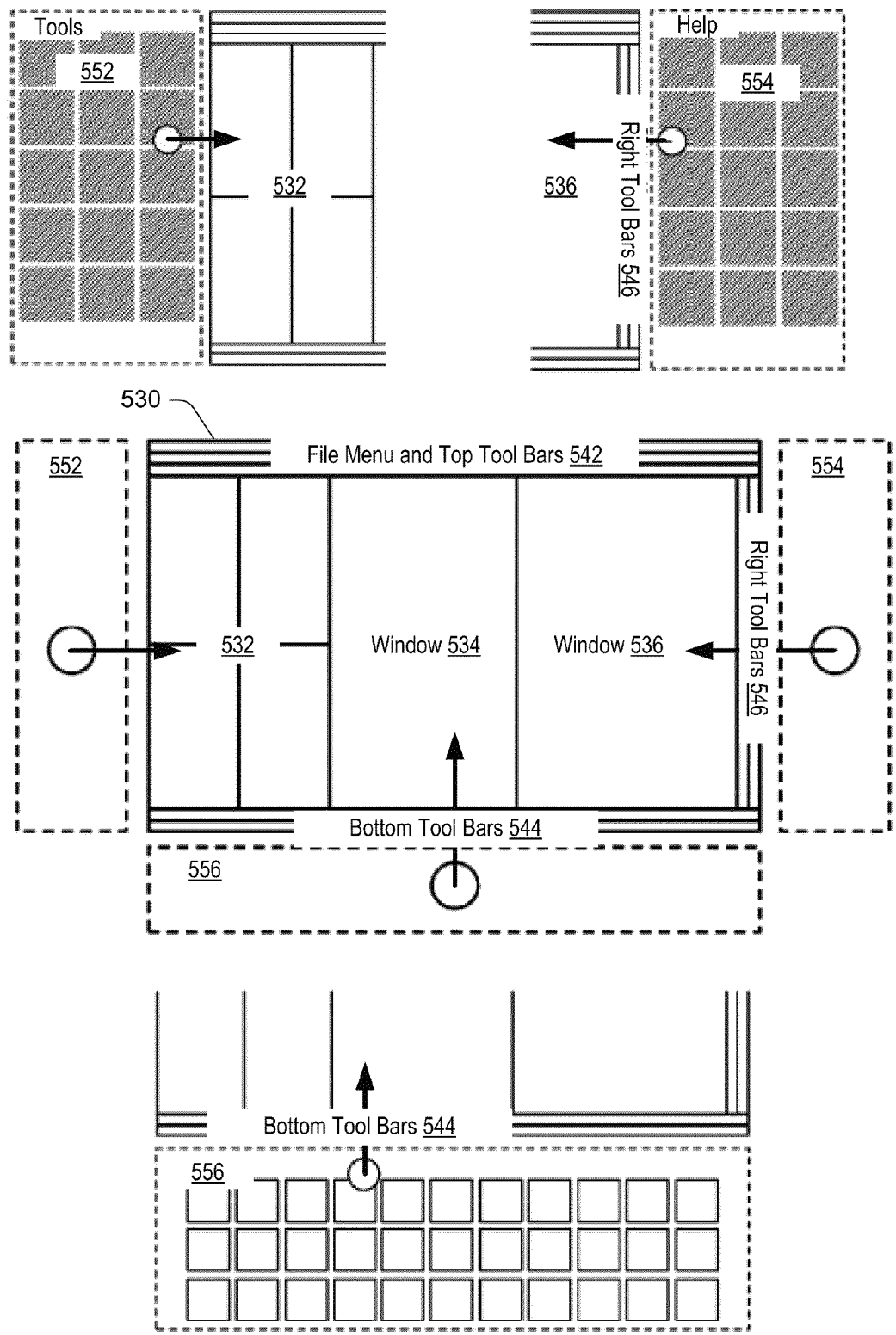
FIG. 5 illustrates an example of a touchscreen with slide in/slide out features.

FIG. 5 shows an example of a screen 530 that includes touch regions 532, 534 and 536 where content may be rendered and controlled via touching as well as chrome regions 542, 544 and 546, which may be touched to render, for example, a tools menu 552 into the touch region 532, a help menu 554 into the touch region 536, a keyboard 556 into a touch region that spans a lower portion of the touch regions 532, 534 and 536. As indicated in the example of FIG. 5, touch controllable features may be rendered in a manner where they appear to slide in and slide out of one or more workspaces (e.g., the regions 532, 534 and 536). For example, a user may touch the bottom chrome 544 using an upward motion to slide in (e.g., to bring forth) the keyboard 556, touch the keyboard 556 for entering one or more keyboard strokes, and then touch the keyboard 556 using a downward motion to slide out (e.g., retract) the keyboard 556. As an example, leftward and rightward touch motions may be used for the tools menu 552 and the help menu 554, for example, for sliding in and sliding out the tools menu 552 and the help menu 554.

As shown in the example of FIG. 5, the tools menu 552 and the help menu 554 may be organized as tiles, which may optionally be user selectable as to their positions. As an example, where a task or tasks are to be performed and where touch hardware is available, the tools menu 552 and/or the help menu 554 may be pre-arranged for that task or those tasks. As an example, where a workflow is a collaborative workflow, the tools menu 552 and/or the help menu 554 may be pre-arranged to enhance collaboration. For example, a tool listed in the tools menu 552 may provide for rendering of a current workflow tree that indicates what tasks have been performed, what tasks are being performed, who is performing tasks, etc. As an example, a tool listed in the tools menu 552 may provide for rendering one or more views being rendered on another screen (e.g., a remote screen). As an example, a tool listed in the tools menu 552 may provide for sharing one or more views being rendered on the screen 530 (e.g., for input of remote touches). As an example, a workflow editor module executable on a system such as the system 201 may provide for selecting, arranging, etc. one or more tools of a tools menu, one or more help items for a help menu, one or more keyboard options (e.g., language, symbols, specialized keys, etc.), etc.

As an example, a displayed keyboard may flick up from bottom edge of screen, left- or right-hand friendly, be displayed in a common location, and be displayed in a size and orientation optimal for a screen. As an example, character-based keys, such as 'a' or '7', may function when pressed to a send key command that is transmitted to a last triggered software. As an example, a keyboard may enable light use touch-based text input machine. As an example, a keyboard may allow a user to free workspace by stowing of physical keyboard, for example, to improve desktop workspace ergonomics, to simplify a collaborative environment, etc.

As an example, a flick is a multiple touch, for example, where multiple touches are sensed over a portion of a touchscreen with respect to a period of time (e.g., a time window). In such an example, a flick may include a direction, which may be approximated as being linear. As an example, a flick may include a velocity, an acceleration, etc. While a flick is mentioned as being a multiple touch, other types of touches or gestures may likewise be considered multiple touches (e.g., a single finger clockwise or counter-clockwise gesture, etc.).

As an example, when implemented in a workflow, a slide in keyboard may provide for writing one or more annotations, messaging, labeling a data object, entering numeric and/or character variables.

Figure 6:
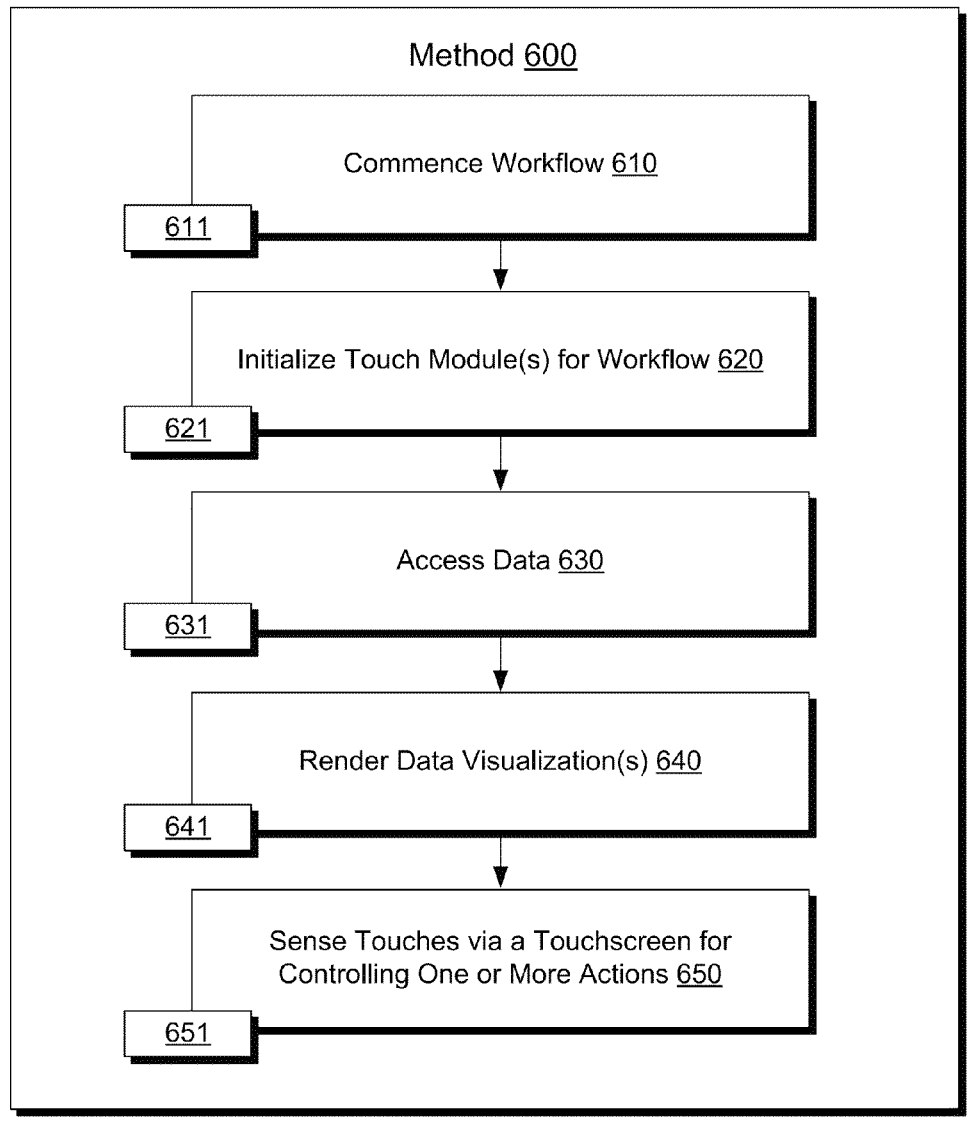
FIG. 6 illustrates examples of methods.
Figure 6:
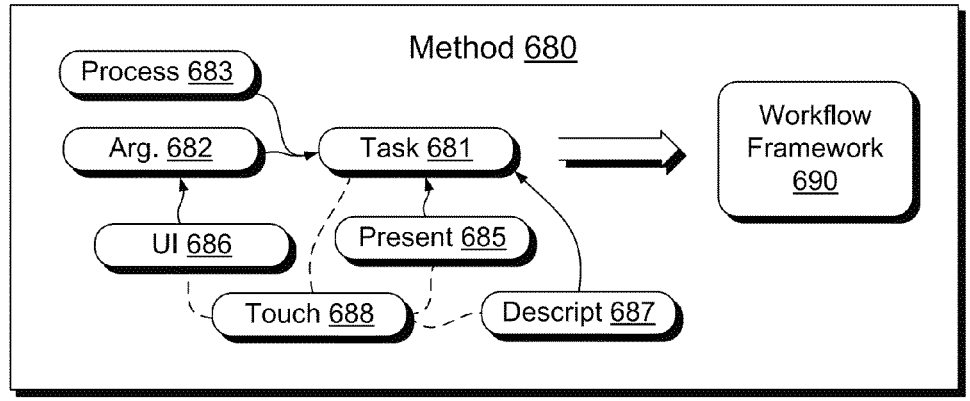

FIG. 6 shows an example of a method 600 that includes a commencement block 610 for commencing a workflow, an initialization block 620 for initializing one or more touch modules for use in performing one or more tasks (e.g., worksteps) of the workflow, an access block 630 for accessing data germane to the workflow, a render block 640 for rendering one or more data visualizations (e.g., based in part on accessed data) to a touchscreen, and a sense block 650 (e.g., an interaction block 650) for sensing touches to interact with the touchscreen for controlling one or more actions, for example, which may include rendering a different view of a data visualization (e.g., responsive to a touch, multitouch, gesture, etc.). In such an example, sensed touches may be associated with one or more appropriate actions according to the one or more touch modules as associated with the workflow. As an example, the initialization block 620 may initialize one or more touch modules, for example, as selected by a workflow editor during creation of the workflow, editing of the workflow, etc. As an example, the one or more touch modules may include instructions for arranging a tools menu, a help menu, a keyboard, etc.

The method 600 is shown in FIG. 6 in association with various computer-readable media (CRM) blocks 611, 621, 631, 641 and 651. Such blocks generally include instructions suitable for execution by one or more processors (or cores) to instruct a computing device or system to perform one or more actions. While various blocks are shown, a single medium may be configured with instructions to allow for, at least in part, performance of various actions of the method 600. As an example, a computer-readable medium (CRM) may be a computer-readable storage medium. As an example, a CRM block may be a module, for example, such as a module as in the one or more modules 207 of the system 201. In such an example, the system 201 may be implemented to perform, at least in part, the method 600 of FIG. 6.

FIG. 6 also shows an example of a method 680 for defining a task that may be part of a workflow and, for example, implemented in a workflow framework 690. As shown in the example of FIG. 6, the method 680 includes a task block 681, an argument block 682, a process block 683, a presentation block 685, a user interface (UI) block 686, a description block 687 and a touch block 688. As an example, the process block 683 may process arguments of the argument block 682 into the task block 681 (e.g., code for a task represented by the task block 681). As an example, the touch block 688 may provide for touch functionality (e.g., one or more multiple touches, gestures, etc.) to the task block 681 directly or indirectly (e.g., as indicated by the various dashed lines). As an example, the presentation block 685 may be configured to specify one or more icons, names, etc.; the UI block 686 may be configured to specify one or more arguments for one or more UIs; and the description block 687 may be configured to specify a description for one or more UIs. As an example, the workflow framework 690 may be a petrotechnical framework (e.g., PETREL® framework, OCEAN® framework, etc.). As an example, the touch block 688 may provide one or more touch modules for a workflow, for example, for initialization in the initialization block 620 of the method 600, for the workflow 480 of FIG. 4, etc. As an example, the method 680 may be implemented by a system such as, for example, the system 201 of FIG. 2 where actions may be performed at least in part by execution of the one or more modules 207 (e.g., which may correspond to one or more blocks of the method 680).

As an example, a method for a workflow may include selecting a workstep class, defining input and output arguments, linking the workstep class and the arguments (e.g., for creating an instance of the workstep class with such arguments), and adding the workstep to the workflow. In such an example, a touch module may include one or more touch classes, which may also be linked such that the added workstep includes touch functionality (e.g., for interacting with that workstep upon its instantiation and use). As an example, where a workstep class is predefined as to its input, output, etc., one or more touch modules may be linked to provide touch functionality for a workstep associated with the workstep class. As an example, one or more touch modules may be linked to a task (e.g., workstep), for example, via a user interface (UI) argument. For example, a UI argument value may act to direct executable code to one or more touch modules, tables, etc. such that touch functionality becomes available during execution of that code. As an example, a touch module may include information to provide a UI (or UIs) with one or more menus, a keyboard, touch functionality, collaboration features, etc.

Figure 7:
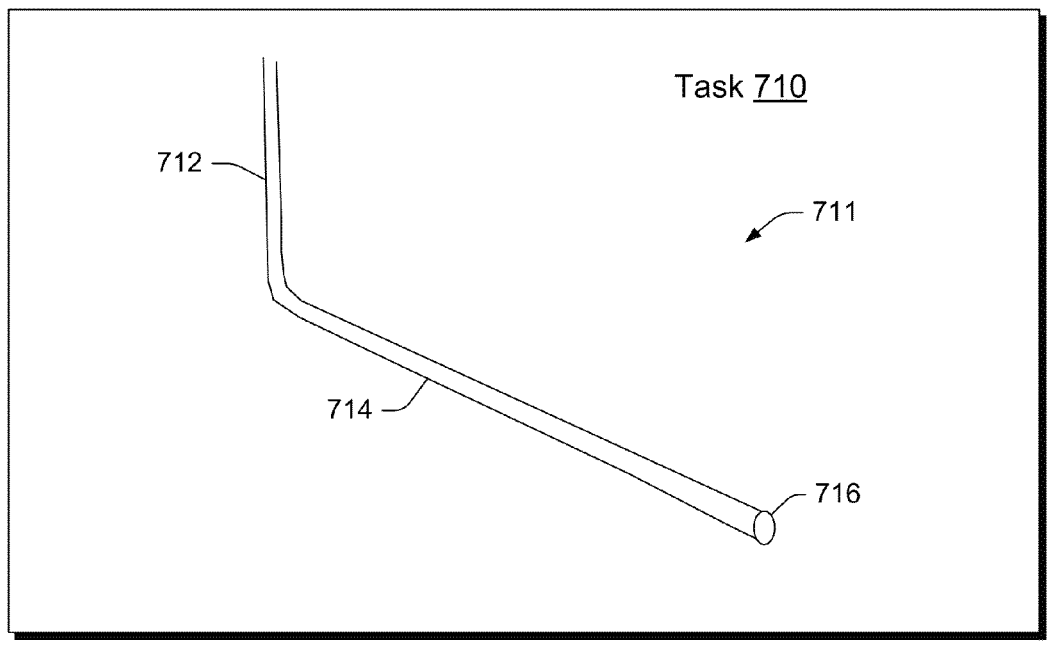
FIG. 7 illustrates examples of tasks associated with a simulation.
Figure 7:
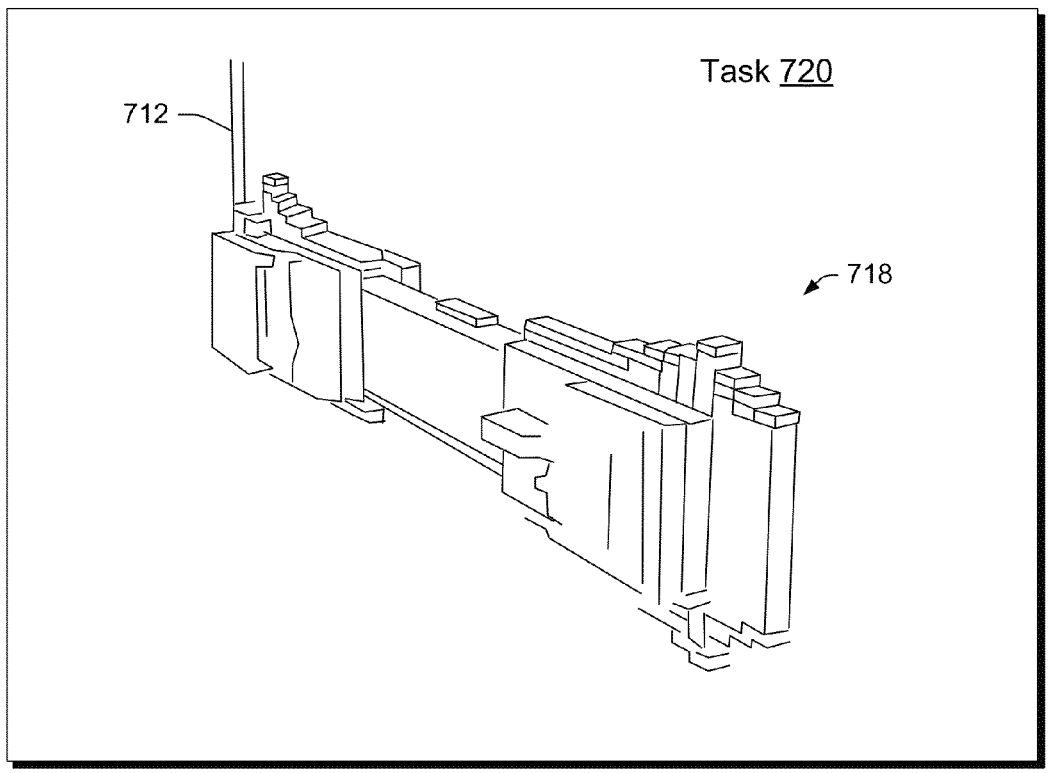

FIG. 7 shows examples of tasks 710 and 720, which may be associated with a workflow, and include rendering one or more visualizations to a screen. For example, consider a workflow to understand how condensate may be distributed about a portion of a wellbore. As to the task 710, it includes rendering a visualization of a portion of a wellbore 711 that includes a vertical segment 712, a horizontal segment 714 and an end 716. Through touches, a user may control a camera, zoom, pan, etc. to better view the portion of the wellbore 711.

As an example, a simulation may be performed using a simulator (see, e.g., various components of the system 100 of FIG. 1) that simulates condensate with respect to time and space (e.g., using a 4D simulation model). As to the task 720, it includes rendering a visualization of the portion of the wellbore 711 along with simulation results 718 that indicate condensate concentration, for example, about the horizontal segment 714 of the wellbore. In such an example, the simulation model may be a grid-based model that includes volumetric grid elements where each element may be assigned a value based on the simulation results. Rendering of such elements may yield a blocky opaque view such as the view associated with the task 720.

Figure 8:
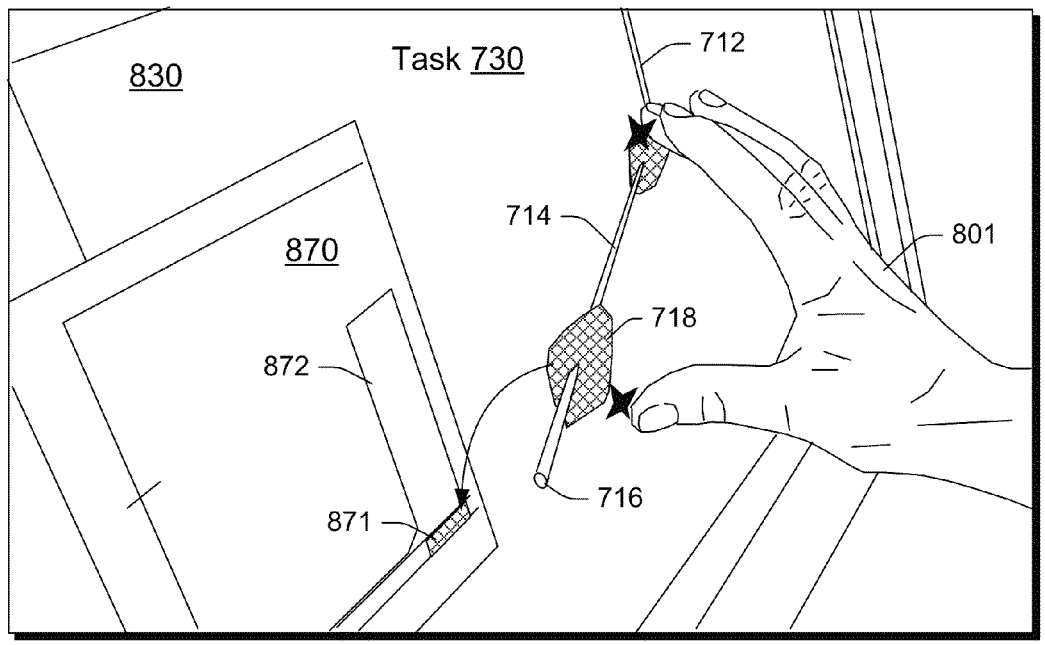
FIG. 8 illustrates examples of tasks associated with a simulation.
Figure 8:
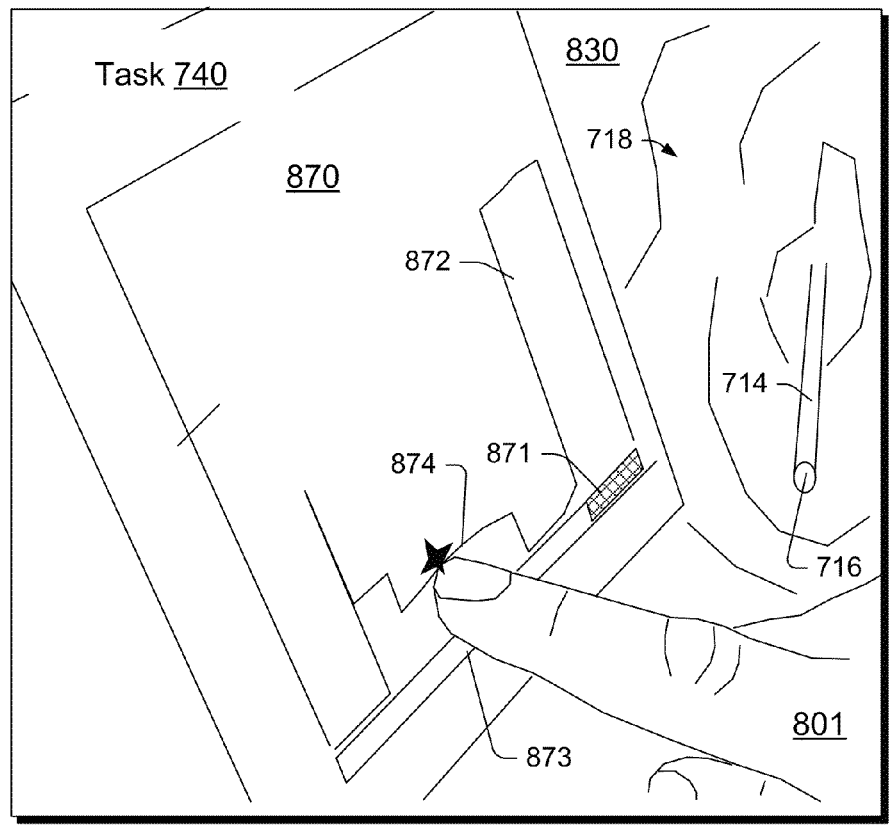

FIG. 8 shows examples of tasks 730 and 740, which may be follow the task 720 of FIG. 7 and provide for enhanced viewing of the simulation results 718 (e.g., viewing the results in a form other than the blocky opaque view). As to the task 730, FIG. 8 shows a hand 801 touching a touchscreen 830 at two points to control rendering of a visualization that includes the vertical segment 712 of the wellbore 711, the horizontal segment 714 of the wellbore 711, the end 716 of the wellbore and the simulation results 718 that indicate condensate concentration. Also shown as being rendered to the screen 830 is a panel 870 for controlling rendering of the simulation results 718, for example, by opacity and color scale for values of the simulation results 718. Specifically, the panel 870 shows a portion of a color scale 871 as having an associated opacity 872 (e.g., transparency, z-buffer value "ghosting", etc.) such that a range of values of the simulation results 718 are rendered to the screen 830 with relatively little opacity and with a particular color (e.g., represented by black and white cross-hatching). As an example, a color scale may span a spectrum of colors (e.g., from red to violet, violet to red, red to green, blue to yellow, etc.), may span a saturation range for a single color (e.g., in a HSL, HSV, etc. color space), etc.

As to the task 740, the hand 801 is shown as interacting with the panel 870 of the screen 830 to adjust one or more parameters that control how the simulation results 718 are rendered to the screen 830. In the example of FIG. 8, the user touches a point in the panel 870 above a portion of the color scale 873 to adjust the opacity value or values 874 for that portion of the color scale 873. The user may touch as many portions of the panel 870 as desired to achieve a rendering of the simulation results 718, for example, to facilitate interpretation of the simulation results 718. In such an example, a user may readily touch and view, touch and view, etc. to gain a better understanding of the simulation results 718. Such touches may be to the panel, to the visualization of the simulation results 718, etc. For example, a user may rotate the portion of the wellbore 711 and adjust one or more opacity levels for one or more portions of the color scale. As an example, a user may use two hands, for example, a left hand for touching the panel 870 to control how simulation results 718 are rendered and a right hand for touching the visualization of the simulation results 718 to orient them (e.g., via a camera, a zoom-in, a zoom-out, a pan, etc.).

Figure 9:
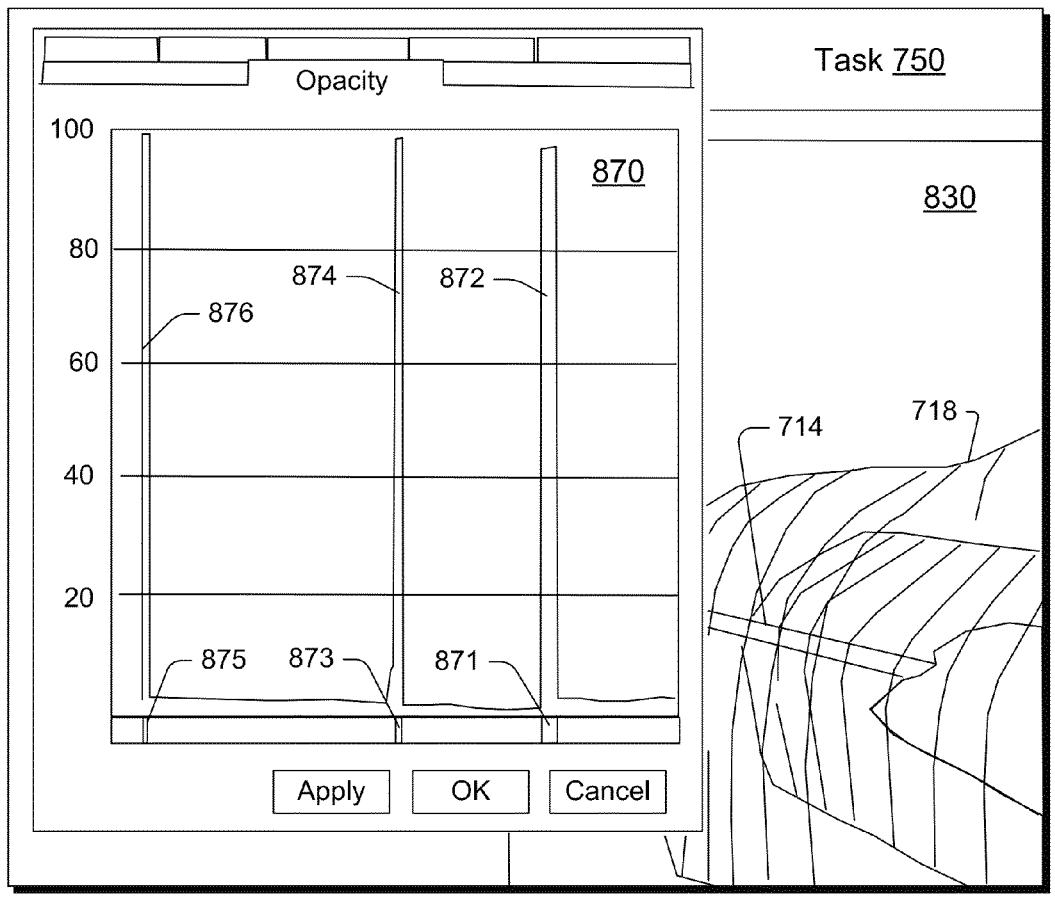
FIG. 9 illustrates an example of a task associated with a simulation.

FIG. 9 shows an example of a task 750 that may follow a prior task, for example, such as one or more of the tasks 710, 720, 730 and 740. In the example of FIG. 9, the screen 830 displays the simulation results 718 with respect to the portion of the wellbore 711 along with the panel 870 where a desired set of parameters has been entered, for example, via touches to the panel 870. For example, the panel 870 shows three relatively short ranges 871, 873 and 875 along the color scale as having associated opacity values 872, 874 and 876, respectively. As indicated by the visualization of the simulation results 718, three shells exist around the horizontal segment 714 of the portion of the wellbore 711, which correspond to the set of parameters shown in the panel 870. In comparison to the blocky opaque view associated with the task 720 of FIG. 7, the visualization associated with the task 750 of FIG. 9 shows three shells with some amount of transparency, for example, to gain a better understanding of condensate phenomena. As an example, the panel 870 may provide one or more other options (see, e.g., upper tabs, control buttons, etc.).

Figure 10:
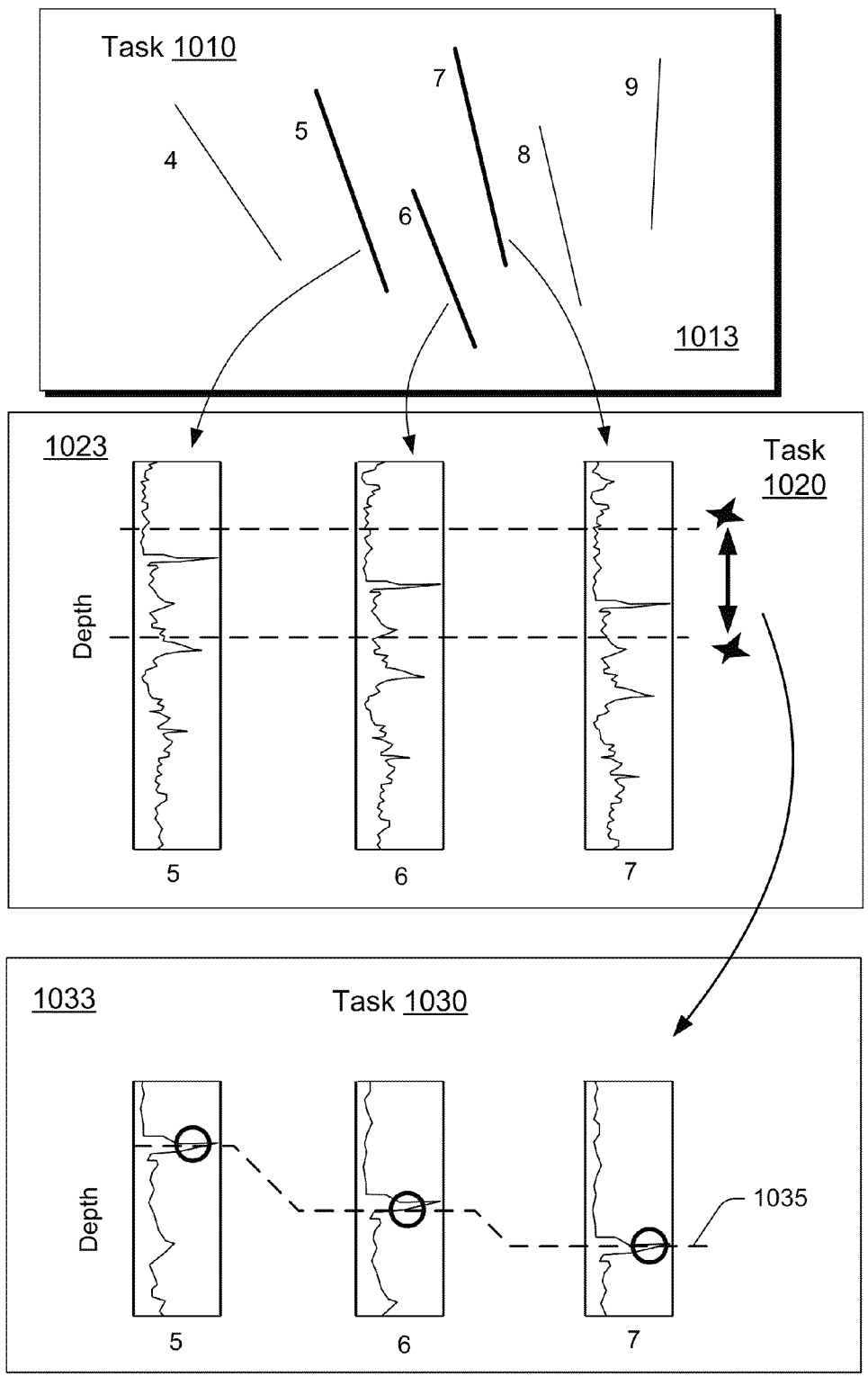
FIG. 10 illustrates examples of tasks associated with wells.

FIG. 10 shows examples of tasks 1010, 1020 and 1030, which may be associated with a workflow, and include rendering one or more visualizations to a screen. For example, consider a workflow to interpret logs for a plurality of wells. As to the task 1010, it includes rendering a visualization of wells 1013, for example, which may be controlled through touches to a touchscreen. As an example, consider a 3D camera being controlled via one or more touches to a touchscreen to adjust a visualization of the wells (see, e.g., the multitouch 3D camera 330 of FIG. 3). In the example of FIG. 10, the task 1010 includes selecting via touches to a touchscreen three of the wells, specifically, wells labeled 5, 6 and 7.

As to the task 1020, well logs associated with the wells 5, 6 and 7 are rendered to provide a visualization of well logs 1023 where each well log is displayed with respect to depth on a vertical axis and a measured value on a horizontal axis. The task 1020 can include implementing a well log camera that is configured for control via touches such as multiple touches (e.g., multitouches), for example, to control rendering of one or more well logs. As an example, touches for a well log camera may include two finger drag to pan (e.g., horizontal and vertical), two finger pinch with vertical tendency in a log track to adjust a vertical scale, two finger pinch with horizontal tendency in a log track to adjust a horizontal scale, a single finger drag in a log track to pan the log up and down, etc. In the example of FIG. 10, the task 1020 includes an outwardly directed spanning of two fingers to enlarge the well logs for wells 5, 6 and 7 to generate a visualization of the well logs 1033, for example, to perform the task 1030.

As to the task 1030, touches may be made to a touchscreen at a particular point on each of the well logs for the wells 5, 6 and 7, for example, where the touches correspond to a feature in each of the well logs that may be associated with a geological layer (e.g., a layer of sediment, etc.). As shown in the visualization 1033, the features are at different depths in each of the well logs, for example, because a geological layer that gives rise to the feature may be sloping within a geologic environment. Upon entry of touches to identify a suspected common feature, a well log analysis module may connect the features via a line 1035 and, for example, define a plane based on the three depth locations.

As an example, one or more users may touch one or more touchscreens such that touch circuitry of the one or more touchscreens performs touch sensing and translates sensed touch to issue one or more commands to control petrotechnical software (e.g., a petrotechnical framework, etc.). As an example, given a touchscreen and rendering of well logs on the touchscreen, one or more users may touch individual well logs (e.g., log tracks) to adjust a depth, a depth range, etc. As an example, one or more of the users may perform a pinch gesture that can be sensed by touch circuitry of the touchscreen to adjust a depth, a depth range, etc. of a well log or well logs. In such a manner, a user may scroll to a depth for a well log (e.g., a beginning depth, an end depth, etc. of a well log) and then enlarge a portion of that well log, for example, to assess a feature (e.g., a change in amplitude, etc. in well log data).

Figure 11:
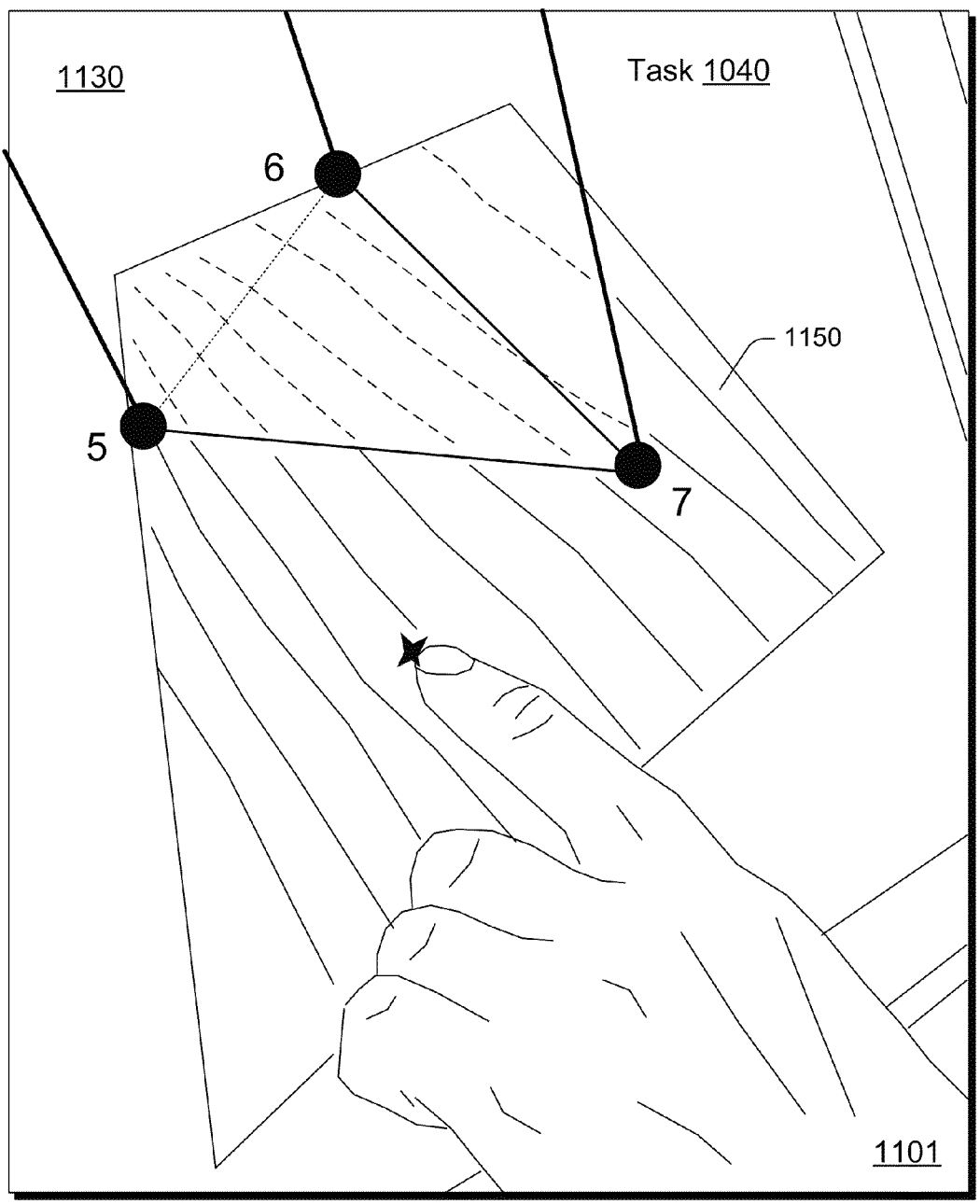
FIG. 11 illustrates an example of a task associated with wells.

FIG. 11 shows an example of a task 1040 that may follow a prior task, for example, such as one or more of the tasks 1010, 1020 and 1030. As an example, the task 1040 may include rendering a visualization 1130 of a plane 1150 that is defined, at least in part, by associated features in well logs such as the well logs for wells 5, 6 and 7, as shown in FIG. 10. In the example of FIG. 11, a user may use his hand 1101 to touch a touchscreen that has rendered the visualization 1130 to adjust a view of the plane 1150, for example, by moving a finger upward to push the plane 1150, moving a finger downward to pull the plane 1150, circling a finger clockwise or counter-clockwise to rotate the plane 1150, etc.

Figure 12:
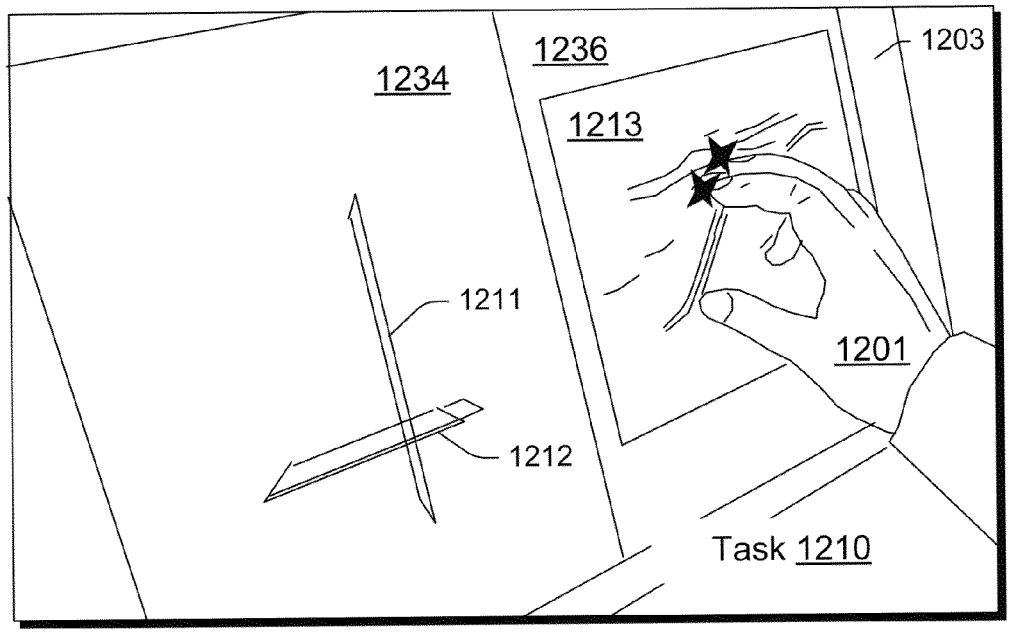
FIG. 12 illustrates examples of tasks associated with seismic data.
Figure 12:
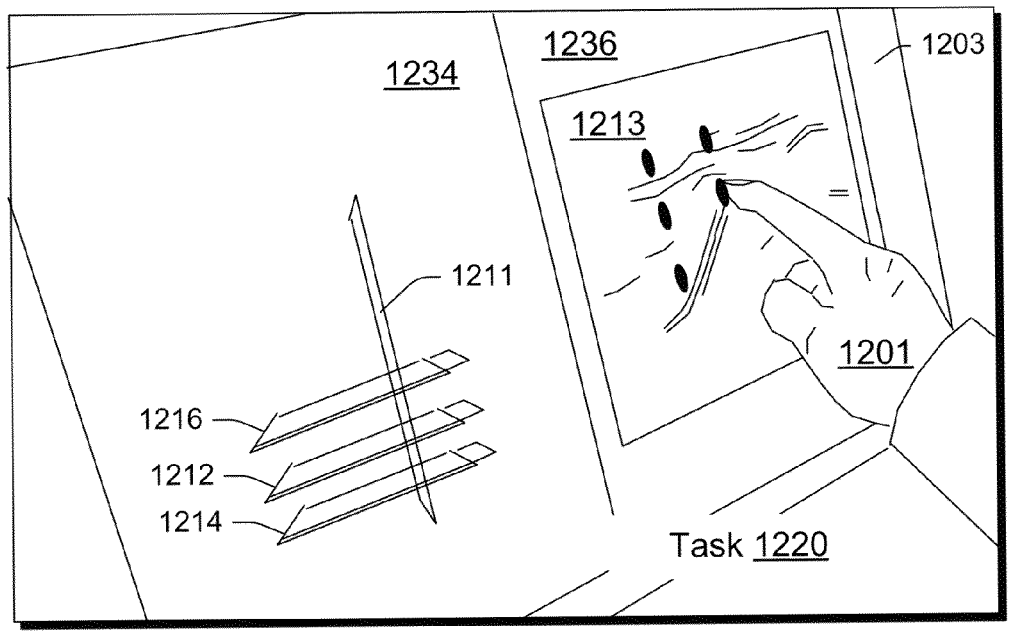

FIG. 12 shows a user's hand 1201, a touchscreen 1203 and examples of tasks 1210 and 1220 with respect to a left region 1234 and a right region 1236 of the touchscreen 1203 (see, e.g., the regions 234 and 236 of the touchscreen 230 of FIG. 2) where one or both of the regions may be touched by the user's hand 1201 for purposes of controlling views, actions, etc. As an example, the tasks 1210 and 1220 may be associated with a workflow that includes rendering one or more visualizations to a screen. As shown in FIG. 12, the left region 1234 provides a perspective view of seismic slices 1211 and 1212 while the right region provides a planar view of a seismic slice 1213, for example, a slice that corresponds to a seismic line of a seismic survey of a geologic environment.

As to the task 1210, a two finger swipe may advance data in a data set such as a seismic volume. For example, where a seismic volume is organized by seismic lines (e.g., inlines and crosslines), a swipe may advance along one of those lines by issuing a command to access the appropriate data and to render a visualization of that data to the right region 1236. As an example, a swipe from right to left may increment to a higher number line while a swipe from left to right may decrement to a lower number line. As an example, where a volume of data is sliced at an angle that is not aligned with an axis defining the data (e.g., an inline or a crossline or a depth or time), an algorithm may access appropriate data to present another slice that is parallel to a rendered slice. For example, such an algorithm may be defined with respect to an inward or outward normal to the slice where incrementing or decrementing occurs for a particular distance along the inward or outward normal.

As to the task 1220, a user may use her hand 1201 to touch the rendered view of the seismic slice 1213 in the right region 1236 such that sensing of the touch by touch circuitry of the touchscreen 1203 causes rendering of one or more seismic slices 1214 and 1216 in the left region 1234. As an example, touches in the seismic slice in the right region 1236 may issue commands for rendering one or more orthogonal slices in the left region 1234. For example, the touchscreen 1203 may sense a series of vertical touches, issue a command to access data for a seismic slice along a seismic line (e.g., an inline or a crossline) and then render a visualization of the data in the left region 1234. As an example, the slice 1211 rendered in the left view 1234 may correspond to the slice 1213 in the right view 1236.

Figure 13:
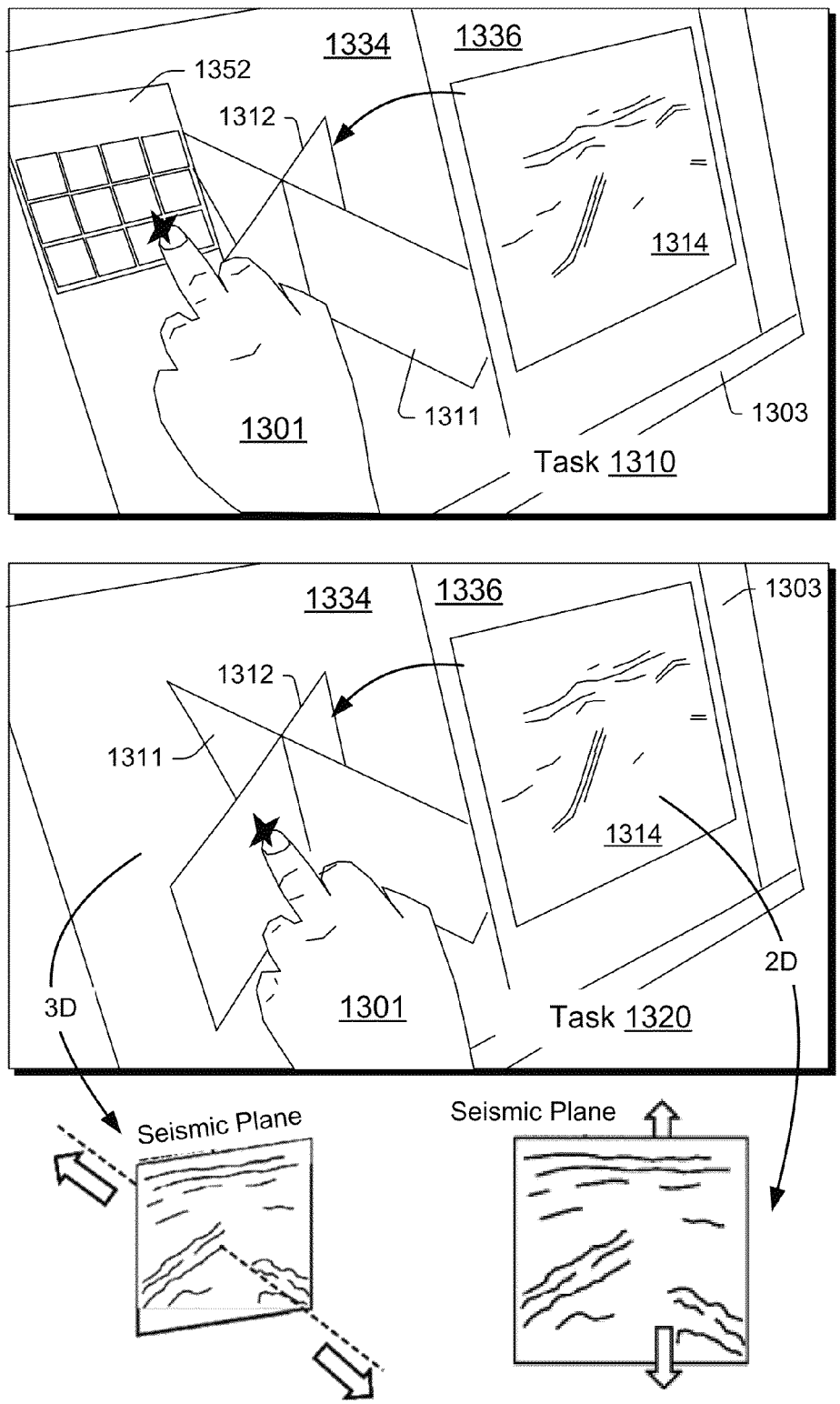
FIG. 13 illustrates examples of tasks associated with seismic data.

FIG. 13 shows a user's hand 1301, a touchscreen 1303 and examples of tasks 1310 and 1320 with respect to a left region 1334 and a right region 1336 of the touchscreen 1203 (see, e.g., the regions 234 and 236 of the touchscreen 230 of FIG. 2) where one or both of the regions may be touched by the user's hand 1301 for purposes of controlling views, actions, etc. As an example, the tasks 1310 and 1320 may be associated with a workflow that includes rendering one or more visualizations to a screen. As shown in FIG. 13, the left region 1334 provides a perspective view of seismic slices 1311 and 1312 while the right region provides a planar view of a seismic slice 1314, for example, a slice that corresponds to a seismic line of a seismic survey of a geologic environment. As an example, the slice 1314 of the right region 1336 may correspond to the slice 1312 of the left region 1334.

As to the task 1310, a finger swipe may cause a tool menu 1352 to be rendered in the left region 1334 and a finger tap may cause activation of a tool listed in the tool menu 1352. As mentioned, where a seismic volume is organized by seismic lines (e.g., inlines and crosslines), a swipe may advance along one of those lines by issuing a command to access the appropriate data and to render a visualization of that data to the right region 1336. As an example, an upward swipe may increment to a higher number line while a downward swipe may decrement to a lower number line.

As to the task 1320, a user may use his hand 1301 to touch one of the slices 1311 and 1312 in the left region 1334 such that sensing of the touch by touch circuitry of the touchscreen 1303 increments to a higher number line and renders a slice for that higher number line (e.g., while maintaining the other slice in a stationary position). As an example, a user may rotate the slices 1311 and 1312 in the left region 1334 (e.g., about their intersection) and then touch one of the slices 1311 and 1312 such that sensing of the touch by touch circuitry of the touchscreen 1303 decrements to a lower number line and renders a slice for that lower number line (e.g., while maintaining the other slice in a stationary position). As an example, the left and right regions 1334 and 1336 may be linked such that a change to a slice in one region is carried over to the other region. For example, if a user increments a slice number in the left region 1334, the corresponding slice may be rendered in the right region 1336 (e.g., and vice-versa).

As an example, a feature in a data set may be represented by a domain object. In such an example, the task 1320 may include manipulating one or more domain objects (e.g., within a framework).

Figure 14:
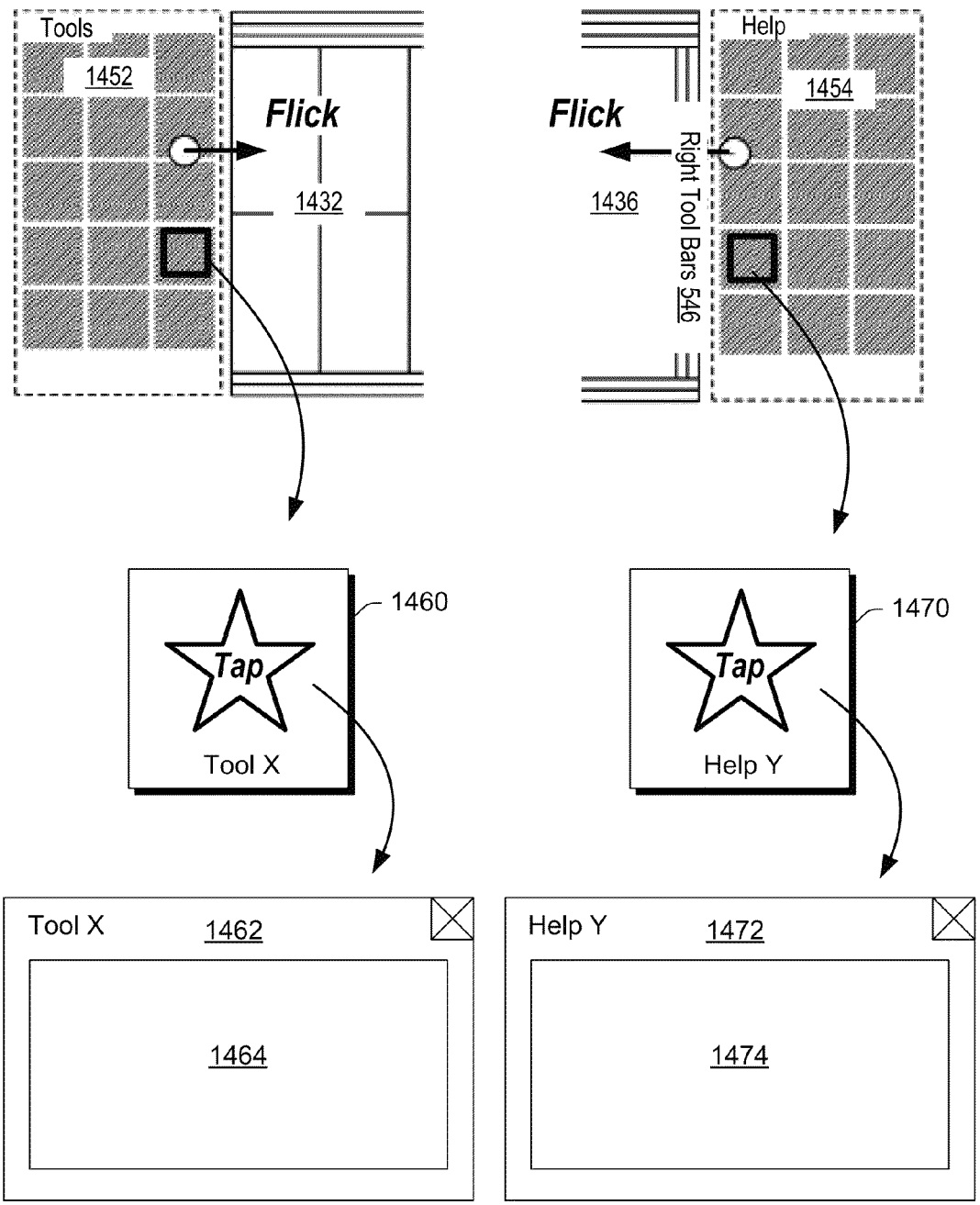
FIG. 14 illustrates an example of a tools menu and a tool item and an example of a help menu and a help menu item.

FIG. 14 shows an example of a tools menu 1452 and an example of a help menu 1454. As an example, a flick touch to a region of a touchscreen may cause the tool menu 1452 to be rendered in a region 1432 of the touchscreen and a flick touch to another region of the touchscreen may cause the help menu 1454 to be rendered to a region 1436 of the touchscreen. Where a menu includes an arrangement of tiles (e.g., optionally associated with a workflow via a workflow editor), a user may touch one of the tiles to activate it. For example, consider a tool tile 1460 and a help tile 1470 where each includes a graphic, which may optionally help guide a user when performing a workflow. For example, a "hint" or other feature may highlight a particular tile (e.g., via coloring, blinking, intensity, etc.) to alert a user that the highlighted tool or menu item may assist the user in performing a task or tasks. As an example, a workflow can include tasks (e.g., worksteps) that may be linked to tools and logic such that when a user completes one task and another task is to be performed thereafter (e.g., based on the logic), a tool associated with the other task may be highlighted in a tools menu such as the tools menu 1452 to guide the user.

As an example, upon selection of the tool tile 1460, information may be rendered as indicated by a panel 1462 that may include content, one or more settings, etc. (e.g., consider the panel 870 of FIG. 8). As an example, upon selection of the menu tile 1470, information may be rendered as indicated by a panel 1472 that may include content (e.g., text, image, video, etc.), one or more settings, one or more hyperlinks, etc.

As an example, a graphic control (e.g., a tile, button, etc.) on a menu may be linked to a macro function. For example, a tile named "New Fault Interpretation" may create an interpretation window, load a default seismic plane, commence a seismic interpretation process, create a new interpretation folder, add a new fault to that folder and enter a "Fault Interpretation" mode.

As an example, a help menu can include tiles (e.g., buttons) that have an illustration and a label. For example, where the illustration and the label describe a help subject (e.g., tile panels vertically, etc.). As an example, a gesture such as a three finger flick may cause a help menu to slide in to view.

Figure 15:
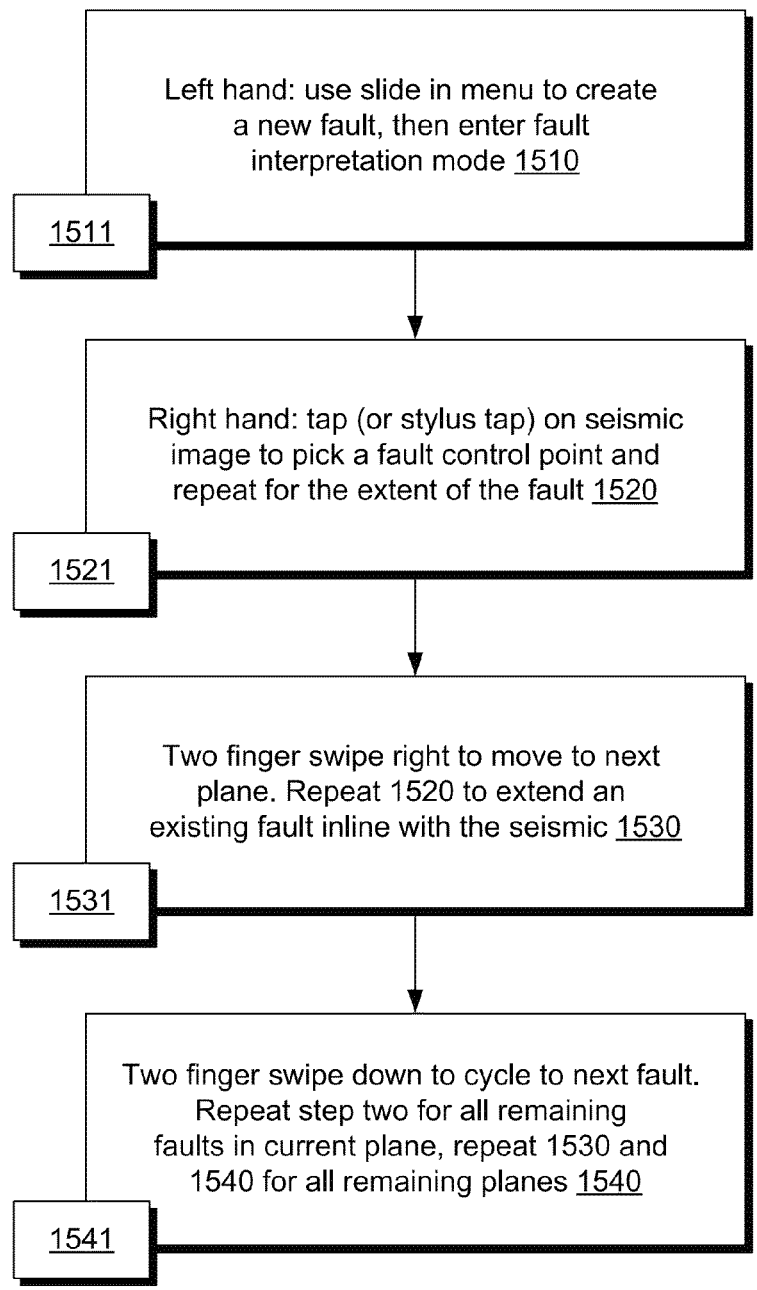
FIG. 15 illustrates an example of a method.

FIG. 15 shows an example of a method 1500 that may be part of a workflow, a task, etc. In the example of FIG. 15, the method 1500 includes a creation block 1510 for creating a new fault and entering a fault interpretation mode, a pick block 1520 for picking a series of fault control points, an increment block 1530 for incrementing to a next slice (e.g., plane) for purposes of extending the fault into that slice, and an increment block 1540 for incrementing to a next fault. In such a manner, a user may act to identify faults within data such as a seismic volume. As shown in the example of FIG. 15, the creation block 1510 may include using a left region of a touchscreen (e.g., via a left hand) while the pick block 1520 may include using a right region of a touchscreen (e.g., via a right hand).

The method 1500 is shown in FIG. 15 in association with various computer-readable media (CRM) blocks 1511, 1521, 1531 and 1541. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1500. As an example, a computer-readable medium (CRM) may be a computer-readable storage medium. As an example, a CRM block may be a module, for example, such as a module as in the one or more modules 207 of the system 201. In such an example, the system 201 may be implemented to perform, at least in part, the method 1500 of FIG. 15.

As an example, various types of touches may be associated with actions (e.g., commands, etc.). As an example, one or more tables may be provided that associate touches with various types of actions (e.g., commands, etc.). As an example, a touch module (see, e.g., the one or more modules 207 of the system 201 of FIG. 2) may include a set or sets of associations (e.g., between touches and actions). As an example, a touch module may include a set or sets of associations organized as or organizable in a table format. As an example, a touch module may be implemented as a layer in a hierarchy such as a hierarchy for the method 210 of FIG. 2. In such an example, as a task changes in a workflow, a touch module may change within the hierarchy where that touch module may be specific to that task. As an example, where a touchscreen renders information to different regions of a touchscreen, each of the regions may be controlled via different touch modules (e.g., a touch module for a planar view region and a touch module for a perspective view region).

Some examples of tables appear below for tap gestures, hold gestures, swipe gestures, flick gestures, rotate gestures, scale gestures, scroll gestures, anchor gestures, and 3D gestures.

| Example Tap Gestures: | |
| --- | --- |
| one finger tap to n-finger tap | Single finger select, Two finger menu |
| one finger to n-finger double tap | Single finger double tap seek to zoom. |
| one finger triple | |

| Example Hold Gestures: | |
| --- | --- |
| one finger to n-finger hold | Menu |

Example Swipe Gestures:

| | |
|---|---|
| one finger to n-finger swipe | 3 finger up/down tile horizontal/vertical, 4 finger down close windows/panels |

Example Flick Gestures:

| | |
|---|---|
| one finger to five finger flick | 2 finger left/right flick next seismic plane, 3 finger left right next/previous fault line/horizon |

Example Rotate Gestures:

| | |
|---|---|
| two finger rotate two hands | Orbit about x and y axis simultaneously |
| two to n-finger rotate one hand | Orbit about z-axis (fixed) |

Example Scale Gestures:

| | |
|---|---|
| two finger vertical scale, | Increase log scale (e.g., one or more), increase log scale (track) when on log. Increase z scale (3d) increase y scale |
| two finger horizontal scale | Increase x scale |
| two to n-finger scale | Zoom in x and y evenly |

Example Scroll Gestures:

| | |
|---|---|
| one to n-finger scroll | Move log track up down, move multiple log tracks up down |

Example Anchor Gestures:

| | |
|---|---|
| anchor tap (three finger left, one finger right) | Select mode (pick an object, e.g., regardless of current mode) |
| anchor double tap | |
| anchor flick | |
| anchor scale | |
| anchor rotate | |

Example 3D Gestures:

| | |
|---|---|
| lock two + 1 finger tilt (precise tilt vertical) | 2 fingers one hand plus one finger second hand tilt about x axis |
| lock two + 1 finger tilt (precise tilt horizontal) | 2 fingers one hand plus one finger second hand tilt about y axis |
| three finger pan (aggressive) | |
| three finger tilt (aggressive) | |

As an example, a method may include an editor for associating one or more touch modules with a task. For example, an editor may include a menu for one or more of the aforementioned gestures. As an example, predefined actions may be provided (e.g., as suggested actions, default actions, etc.), which may be editable, for example, to customize one or more gestures and actions for a task or tasks. For example, entries in the right columns of the foregoing tables may be editable to select other actions, make other associations, etc. (e.g., noting that the same may be available for entries in the left columns).

As an example, an editor to edit touch and action associations may be a plug-in or included as part of a workflow editor, for example, which may be configured to define, select, edit, etc. one or more tasks (e.g., worksteps) that form a workflow (see, e.g., the workflow 480 of FIG. 4). As an example, consider a workstep that takes input and creates a result via an algorithm, for example, where one or more of the input, the algorithm, the result, etc. may be subject to one or more touches (e.g., via a touchscreen or touchscreens) with one or more associated actions. In such an example, the one or more touches and one or more associated actions may optionally be configured using the workflow editor.

As an example, a method can include commencing a petrotechnical analysis workflow (e.g., that includes a plurality of tasks); initializing one or more touch modules associated with the workflow; accessing data associated with the workflow; rendering one or more visualizations of the data to a touchscreen; and sensing multiple touches via the touchscreen for controlling one or more actions associated with the workflow according to the one or more touch modules. In such an example, the one or more touch modules may associate touches and actions for each of the plurality of tasks.

As an example, a method can include, responsive to sensing multiple touches, rendering a menu of items to a region of the touchscreen. For example, a method may include rendering a menu selected from one of a plurality of different menus associated with a workflow. As an example, the menu may be associated with one of a plurality of tasks of the workflow and include items (e.g., tool items, help items, etc.) for performing that task.

As an example, a method can include, responsive to sensing multiple touches, rendering a panel to a region of a touchscreen where the panel includes one or more visualization controls (e.g., rendering controls such as opacity controls, etc.). In such an example, the rendered panel can include a touchable region for adjusting one or more opacity values for rendering of data values. As an example, for simulation results, sensing of touches to the panel may alter a visualization of the simulation results (e.g., in real-time or near real-time).

As an example, a method can include providing (e.g., or accessing) volume data for a reservoir organized with respect to three axes, rendering a visualization of a portion of the volume data and sensing multiple touches (e.g., a swipe) that controls traversing at least one of the three axes of the volume data to render another visualization of at least another portion of the volume data.

As an example, a method can include rendering a first visualization to a first region of a touchscreen and rendering a second visualization to a second region of the touchscreen. In such an example, one or more touch modules can include a first set of touch associations for the first visualization and a second set of touch associations for the second visualization (e.g., where the first set differs from the second set). As an example, one set may be for a planar visualization and another set may be for a perspective visualization.

As an example, a method can include rendering well logs to a touchscreen. In such an example, the method may include sensing multiple touches via the touchscreen to sense multiple touches for controlling one or more actions associated with the well logs (e.g., according to a touch module being a well logs module that associates multiple touches with one or more actions for analyzing well logs). As an example, such a method may include initializing the touch module as part of a well logs analysis task of a workflow.

As an example, a method can include rendering a visualization of a seismic slice of a seismic data volume and sensing multiple touches via a touchscreen for controlling selection of the seismic slice.

As an example, a system can include a processor; memory operatively coupled to the processor; and one or more modules stored in the memory that include instructions executable by the processor to instruct the system to commence a petrotechnical analysis workflow that includes a plurality of tasks; initialize one or more touch modules associated with the workflow; access data associated with the workflow; render one or more visualizations of the data to a touchscreen; and sense multiple touches via the touchscreen for controlling one or more actions associated with the workflow according to the one or more touch modules. Such a system may include touch modules for sets of associations between multiple touches and actions.

Figure 16:
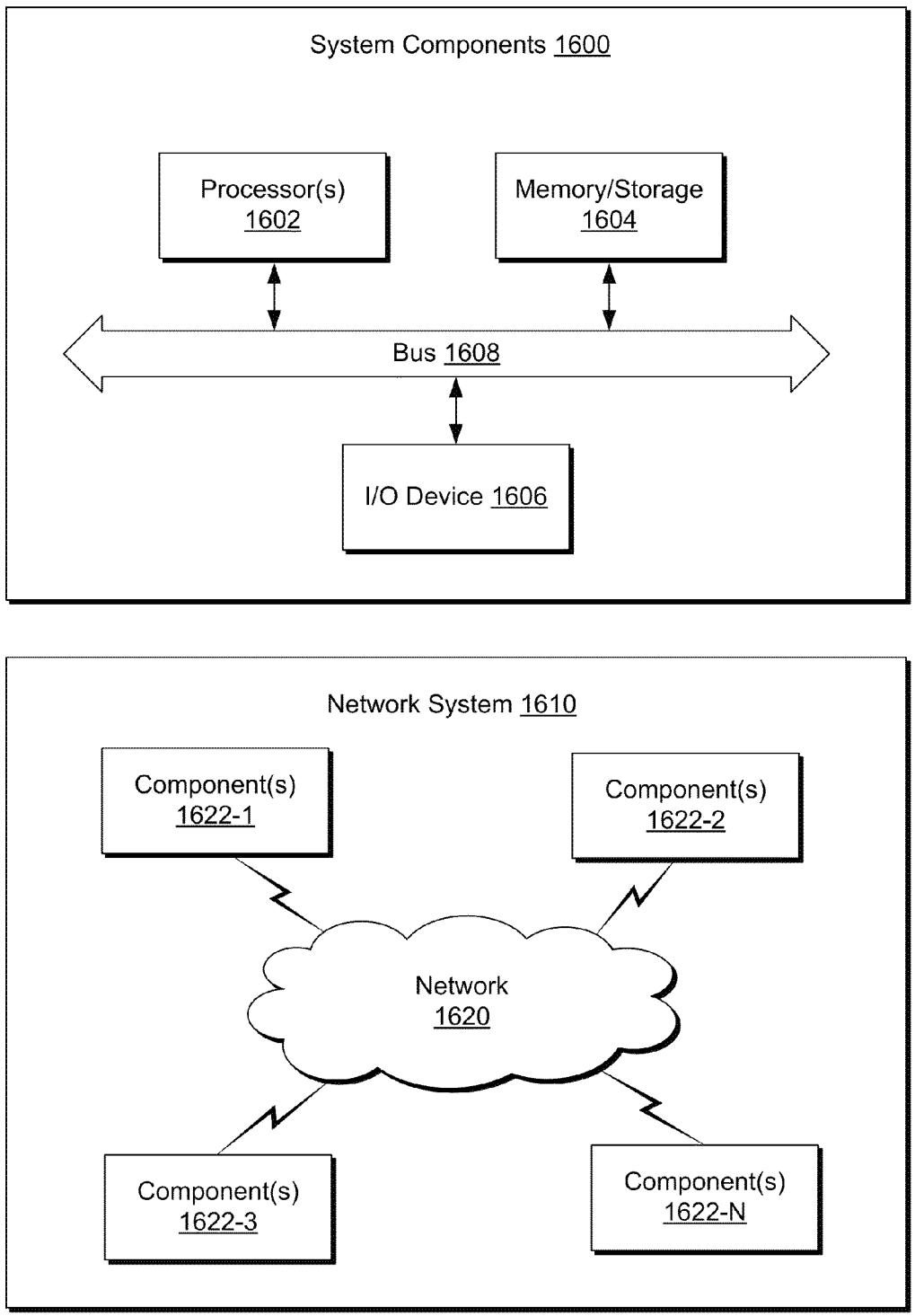
FIG. 16 illustrates example components of a system and a networked system.

As an example, one or more computer-readable storage media can include computer-executable instructions to instruct a computing device to: commence a petrotechnical analysis workflow that includes a plurality of tasks; initialize one or more touch modules associated with the workflow; access data associated with the workflow; render one or more visualizations of the data to a touchscreen; and sense multiple touches via the touchscreen for controlling one or more actions associated with the workflow according to the one or more touch modules FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments without materially departing from a radial bearing assembly (or assemblies) for a centrifugal pump. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

The following document is incorporated by reference herein: US Patent Application Publication No. 2012/0144306 A1, entitled "Method and system for interacting or collaborating with exploration", published 7 Jun. 2012, to Moody et al.

What is claimed is:
1. A method comprising:
commencing a petrotechnical analysis workflow that comprises a plurality of tasks;
initializing one or more touch modules associated with the workflow;
accessing data associated with the workflow wherein the data comprise property data associated with a geologic environment;
rendering visualizations to a touchscreen to render a first visualization of at least one two-dimensional plot of at least a portion of the property data to a first individual panel of the touchscreen and to render a second visualization of a perspective view of at least one feature in the geological environment to a second individual panel of the touchscreen wherein the one or more touch modules comprise a first set of two-dimensional plot scale touch associations for the first visualization and a second set of perspective view touch associations for the second visualization; and sensing multiple touches via the touchscreen for controlling one or more actions associated with the workflow according to the one or more touch modules wherein the actions comprise an action that alters the second visualization based at least in part on sensing multiple touches via the first individual panel and an action that alters the first visualization based at least in part on sensing multiple touches via the second individual panel.

2. The method of claim 1 wherein the one or more touch modules associate touches and actions for each of the plurality of tasks.

3. The method of claim 1 comprising, responsive to sensing multiple touches, rendering a menu of items to a region of the touchscreen.

4. The method of claim 3 wherein the menu comprises one of a plurality of different menus associated with the workflow.

5. The method of claim 3 wherein the menu is associated with one of the plurality of tasks and comprises items for performing that task.

6. The method of claim 3 wherein the menu comprises tool items.

7. The method of claim 3 wherein the menu comprises help items.

8. The method of claim 1 wherein the first individual panel comprises one or more opacity controls for controlling opacity in the second visualization of the second individual panel.

9. The method of claim 1 wherein the property data comprise simulation results.

10. The method of claim 1 wherein the data comprise volume data for a reservoir organized with respect to three axes, wherein the rendering visualizations renders a visualization of a portion of the volume data and wherein the sensing multiple touches comprises sensing a swipe that controls traversing at least one of the three axes of the volume data to render another visualization of at least another portion of the volume data.

11. The method of claim 1 wherein the at least one two-dimensional plot comprises well logs and wherein the sensing multiple touches via the touchscreen senses multiple touches for controlling one or more actions associated with the well logs according to one of the one or more touch modules being a well logs module that associates multiple touches with one or more actions for analyzing well logs.

12. The method of claim 11 wherein the rendering corresponds to one of the plurality of tasks being a well logs analysis task of the workflow.

13. The method of claim 1 wherein the rendering visualizations to a touchscreen renders a visualization of a seismic slice of a seismic data volume and wherein the sensing multiple touches via the touchscreen controls selection of the seismic slice.

14. The method of claim 1, responsive to sensing multiple touches via the second individual panel, rendering information in the first individual panel associated with data represented by the second visualization in the second individual panel.

15. The method of claim 14 comprising sensing at least one touch via the first individual panel and, responsive to sensing the at least one touch, altering the second visualization in the second individual panel.

16. A system comprising:
a processor;
memory operatively coupled to the processor; and
one or more modules stored in the memory that comprise instructions executable by the processor to instruct the system to
commence a petrotechnical analysis workflow that comprises a plurality of tasks;
initialize one or more touch modules associated with the workflow;
access data associated with the workflow wherein the data comprise property data associated with a geologic environment;
render visualizations to a touchscreen to render a first visualization of at least one two-dimensional plot of at least a portion of the property data to a first individual panel of the touchscreen and to render a second visualization of a perspective view of at least one feature in the geological environment to a second individual panel of the touchscreen wherein the one or more touch modules comprise a first set of two-dimensional plot scale touch associations for the first visualization and a second set of perspective view touch associations for the second visualization; and
sense multiple touches via the touchscreen for controlling one or more actions associated with the workflow according to the one or more touch modules wherein the actions comprise an action that alters the second visualization based at least in part on sensing multiple touches via the first individual panel and an action that alters the first visualization based at least in part on sensing multiple touches via the second individual panel.

17. The system of claim 16 wherein the one or more touch modules comprise sets of associations between multiple touches and actions.

18. One or more non-transitory computer-readable storage media comprising computer-executable instructions to instruct a computing device to:
commence a petrotechnical analysis workflow that comprises a plurality of tasks;
initialize one or more touch modules associated with the workflow;
access data associated with the workflow wherein the data comprise property data associated with a geologic environment;
render visualizations to a touchscreen to render a first visualization of at least one two-dimensional plot of at least a portion of the property data to a first individual panel of the touchscreen and to render a second visualization of a perspective view of at least one feature in the geological environment to a second individual panelregion of the touchscreen wherein the one or more touch modules comprise a first set of two-dimensional plot scale touch associations for the first visualization and a second set of perspective view touch associations for the second visualization; and
sense multiple touches via the touchscreen for controlling one or more actions associated with the workflow according to the one or more touch modules wherein the actions comprise an action that alters the second visualization based at least in part on sensing multiple touches via the first individual panel and an action that alters the first visualization based at least in part on sensing multiple touches via the second individual panel.

* * * * *